US010600097B2

(12) United States Patent
Angell et al.

(10) Patent No.: US 10,600,097 B2
(45) Date of Patent: Mar. 24, 2020

(54) DISTRIBUTING ACTION ITEMS AND ACTION ITEM REMINDERS

(71) Applicant: QUALTRICS, LLC, Provo, UT (US)

(72) Inventors: Jeffrey Angell, Lynnwood, WA (US); Colin Michael Leung, Seattle, WA (US); Qiang Guo, Seattle, WA (US); Phil Napieralski, Seattle, WA (US)

(73) Assignee: Qualtrics, LLC, Provo, UT (US)

( * ) Notice: Subject to any disclaimer, the term of this patent is extended or adjusted under 35 U.S.C. 154(b) by 499 days.

(21) Appl. No.: 15/199,678

(22) Filed: Jun. 30, 2016

(65) Prior Publication Data

US 2018/0005289 A1 Jan. 4, 2018

(51) Int. Cl.
*G06Q 30/00* (2012.01)
*G06Q 30/06* (2012.01)
*H04L 12/58* (2006.01)

(52) U.S. Cl.
CPC ......... *G06Q 30/0613* (2013.01); *H04L 51/02* (2013.01)

(58) Field of Classification Search
CPC ..... G06Q 30/06; G06Q 30/0613; H04L 51/02
See application file for complete search history.

(56) References Cited

U.S. PATENT DOCUMENTS

| | | | |
|---|---|---|---|
| 5,410,724 A | 4/1995 | Worthy | |
| 5,732,257 A * | 3/1998 | Atkinson | .................. G06F 8/51 |
| 6,052,121 A | 4/2000 | Webster et al. | |
| 6,189,029 B1 | 2/2001 | Fuerst | |
| 6,754,676 B2 | 6/2004 | Dietz et al. | |
| 7,085,812 B1 * | 8/2006 | Sherwood | ........... H04L 12/5875 |
| | | | 709/206 |
| 7,383,200 B1 | 6/2008 | Walker et al. | |
| 7,509,382 B1 * | 3/2009 | Jania | ................... H04L 12/1831 |
| | | | 709/206 |
| 8,019,753 B2 | 9/2011 | Podgorny et al. | |
| 8,335,719 B1 | 12/2012 | Quraishi et al. | |
| 8,417,715 B1 | 4/2013 | Bruckhaus et al. | |
| 8,543,578 B2 | 9/2013 | Spaggiari | |
| 8,751,327 B2 | 6/2014 | Park et al. | |
| 8,849,854 B2 | 9/2014 | Kakarla et al. | |

(Continued)

OTHER PUBLICATIONS

No Author "Creating and using online surveys" University of Exeter Jul. 2012. Retrieved from https://as.exeter.ac.uk/media/universityofexeter/academicservices/educationenhancement/cascade/Creating_and_using_online_surveys.pdf (Year: 2012).*

(Continued)

*Primary Examiner* — Naeem U Haq
(74) *Attorney, Agent, or Firm* — Keller Jolley Preece

(57) ABSTRACT

Embodiments of the present disclosure relate to generating and distributing action items in response to responses and further performing various reminder actions for the action items. In particular, systems and methods disclosed herein facilitate implementation of action items in response to receiving feedback data within responses to electronic survey questions. For example, systems and methods disclosed herein facilitate generating action items in response to given customer responses to one or more electronic survey questions. Additionally, systems and methods disclosed herein provide one or more reminders to one or more entities to follow up and ensure performance of various tasks associated with respective action items.

20 Claims, 10 Drawing Sheets

(56) References Cited

U.S. PATENT DOCUMENTS

| | | | |
|---|---|---|---|
| 8,909,587 B2 | 12/2014 | Alush et al. | |
| 9,514,436 B2 | 12/2016 | Marci et al. | |
| 9,881,010 B1 | 1/2018 | Gubin et al. | |
| 10,140,739 B1 | 11/2018 | Burgin et al. | |
| 2001/0052122 A1 | 12/2001 | Nanos et al. | |
| 2002/0052774 A1 | 5/2002 | Parker et al. | |
| 2002/0161752 A1 | 10/2002 | Hutchison | |
| 2003/0105659 A1 | 6/2003 | Eisenstein | |
| 2005/0060222 A1 | 3/2005 | White | |
| 2006/0129446 A1 | 6/2006 | Ruhl et al. | |
| 2006/0212413 A1 | 9/2006 | Rujan et al. | |
| 2007/0150279 A1 | 6/2007 | Gandhi et al. | |
| 2007/0244865 A1* | 10/2007 | Gordon | G06F 17/3056 |
| 2008/0201130 A1 | 8/2008 | Peters et al. | |
| 2008/0263022 A1 | 10/2008 | Kostorizos et al. | |
| 2009/0083096 A1 | 3/2009 | Liu et al. | |
| 2009/0287642 A1 | 11/2009 | Poteet et al. | |
| 2009/0306967 A1 | 12/2009 | Nicolov et al. | |
| 2011/0076663 A1 | 3/2011 | Krallman et al. | |
| 2011/0173049 A1 | 7/2011 | McHale | |
| 2013/0297292 A1* | 11/2013 | Agarwal | G06F 17/272 704/9 |
| 2013/0339074 A1 | 12/2013 | Nagy et al. | |
| 2013/0346128 A1 | 12/2013 | Kibbe | |
| 2014/0149836 A1* | 5/2014 | Bedard | G06F 17/2247 715/212 |
| 2014/0156349 A1* | 6/2014 | McLoughlin | G06Q 30/0203 705/7.32 |
| 2014/0234810 A1 | 8/2014 | Flor et al. | |
| 2014/0289231 A1 | 9/2014 | Palmert | |
| 2014/0310062 A1 | 10/2014 | Klein et al. | |
| 2014/0310329 A1 | 10/2014 | Jones et al. | |
| 2014/0316856 A1 | 10/2014 | Williams et al. | |
| 2014/0358636 A1 | 12/2014 | Nowak et al. | |
| 2015/0142888 A1 | 5/2015 | Browning et al. | |
| 2015/0161248 A1 | 6/2015 | Majkowska | |
| 2015/0234571 A1 | 8/2015 | Lee et al. | |
| 2015/0269529 A1 | 9/2015 | Kyllonen et al. | |
| 2015/0324811 A1 | 11/2015 | Courtright et al. | |
| 2016/0019569 A1 | 1/2016 | Jaggi et al. | |
| 2016/0070762 A1 | 3/2016 | Nicholls et al. | |
| 2016/0110789 A1 | 4/2016 | Gilb | |
| 2016/0180359 A1 | 6/2016 | Qu | |
| 2016/0196491 A1 | 7/2016 | Chandrasekaran et al. | |
| 2016/0299965 A1 | 10/2016 | Starr | |
| 2016/0350293 A1 | 12/2016 | Gates | |
| 2016/0350771 A1 | 12/2016 | Gardner | |
| 2017/0124174 A1 | 5/2017 | Starr et al. | |
| 2018/0032606 A1 | 2/2018 | Tolman et al. | |
| 2018/0240138 A1 | 8/2018 | Le et al. | |
| 2018/0268052 A1 | 9/2018 | Litvak et al. | |
| 2019/0146984 A1 | 5/2019 | Starr | |

OTHER PUBLICATIONS

Matthias Schonlau et al. "Conducting Research Surveys via E-mail and the Web" © 2002 Rand Corporation, ISBN/EAN: 0-8330-3110-4. Retrieved from https://www.rand.org/pubs/rnonograph_reports/MR1480.html (Year: 2002).*
U.S. Appl. No. 14/682,964, Jun. 15, 2017, Office Action.
U.S. Appl. No. 14/727,511, Jun. 21, 2017, Office Action.
"A Literature Survey on Fatigue Analysis Approaches for Rubber", by W Mars and F Fatemi, Department of Mechanical, Industrial, and Manufacturing Engineering, University of Toledo, Toledo, OH 43606-3390, USA, International Journal of Fatigue 24, pp. 949-961, 2002. (Year: 2002).
U.S. Appl. No. 14/682,964, Jan. 10, 2018, Office Action.
U.S. Appl. No. 14/727,511, Jan. 29, 2018, Office Action.
U.S. Appl. No. 14/682,964, May 3, 2018, Office Action.
U.S. Appl. No. 14/927,256, May 31, 2018, Office Action.
U.S. Appl. No. 14/682,964, Oct. 10, 2018, Notice of Allowance.
U.S. Appl. No. 14/727,511, Aug. 10, 2018, Office Action.
U.S. Appl. No. 14/927,256, Nov. 1, 2018, Office Action.
U.S. Appl. No. 14/727,511, Jan. 9, 2019, Office Action.
U.S. Appl. No. 14/927,256, Feb. 25, 2019, Notice of Allowance.
LimeSurvey, 2015, https://web.archive.org/web/20150501055458/http://ie.usca.edu/Linne/handout.pdf (Year: 2015).
U.S. Appl. No. 14/727,511, Apr. 29, 2019, Office Action.
U.S. Appl. No. 15/649,477, May 16, 2019, Office Action.
U.S. Appl. No. 15/472,893, May 31, 2019, Office Action.
U.S. Appl. No. 14/727,511, Nov. 7, 2019, Office Action.
U.S. Appl. No. 15/649,477, Nov. 27, 2019, Office Action.
U.S. Appl. No. 15/472,893, Dec. 11, 2019, Office Action.

* cited by examiner

| Ticket ID | Representative ID | Priority | Action | Duration | Status | |
|---|---|---|---|---|---|---|
| 1002 | Jake | Middle | Email Response | 4 Days | Open | Link |
| 1008 | Jake | High | Phone Call | 4 Days | Not Started | Link |
| 1011 | Ashley | Low | Email Coupon | 3 Days | Open | Link |
| 1012 | John | High | Phone Call | 1 Day | Open | Link |
| 1019 | Ashley | Middle | Phone Call | 1 Day | In Progress | Link |

*Fig. 3*

DISTRIBUTING ACTION ITEMS AND ACTION ITEM REMINDERS

BACKGROUND

1. Technical Field

One or more embodiments of the present disclosure relate generally electronic survey systems. More specifically, one or more disclosed embodiments relate to systems and methods for reacting to customer feedback within an electronic survey.

2. Background and Relevant Art

Companies often rely on opinions and feedback from past customers to improve the experience of current and future customers. A common method of acquiring feedback is through electronic surveys, including electronic customer ratings and reviews (e.g., ratings and reviews for products, services, businesses, etc.). For example, companies often administer electronic surveys to customers to collect meaningful information about the experience of any number of customers with a particular company.

Upon collecting information via administration of electronic surveys, companies can use the customer feedback in a variety of ways. For example, companies can use collected electronic survey information to address complaints or issues identified by customers in response to taking an electronic survey. Additionally, companies can utilize electronic survey information to address company policies and/or employee behavior identified by customers via an electronic survey.

With the increased convenience and administration of electronic surveys, companies can collect massive amounts of electronic survey information from millions of customers. As a result of the massive collection of electronic survey information, conventional systems are unpractical or prohibitive when attempting to manage massive collections of electronic survey information. Thus, while the administration of electronic surveys has enabled companies to collect greater amounts of meaningful data, it has become increasingly difficult for companies to timely and effectively use the customer feedback data received via electronic surveys.

For example, conventional systems fail to practically parse and interpret electronic survey information on a large scale to identify appropriate actions. For instance, where a third party administers an electronic survey and provides the received electronic survey information to a business, representatives of the business must often manually review the received electronic survey information and determine appropriate action to take on a case-by-case basis with regard to associated customer feedback. Additionally, and based on a manual review process, the business often reviews massive amounts of electronic survey information that does not merit a corresponding response from the company. As such, reviewing and managing customer data from an electronic survey can be inefficient and costly from both a time and cost perspective.

Furthermore, upon determining that certain electronic survey information (e.g., customer data) merits a response, conventional systems often fail to provide tasks and relevant information to the appropriate representative and departments within a business. For example, conventional systems often fail to effectively compile and communicate tasks effectively to individual employees or teams of employees trained to respond to particular customer data from an electronic survey. Further, conventional systems often do not provide context with the customer data, and thus, even in the event the correct personnel is notified of the customer data, the personnel may not know exactly how to respond to the customer data.

Additionally, as a result of the massive amount of electronic survey information and the inefficient analysis of the customer data, many businesses fail to timely address electronic survey information. For example, particular responses that a business may be able to take with respect to electronic survey information become difficult or impossible for a business to recognize within a time period that allows for an effective response. Additionally, conventional systems typically have no defined business personnel accountability connected with electronic survey information (e.g., customer data) from electronic surveys. As such, customer data from electronic surveys that contain valuable insights and information is often disregarded, overlooked, or underutilized.

Accordingly, these and other disadvantages exist with respect to conventional systems and methods for generating and distributing action items.

SUMMARY

Embodiments of the present disclosure provide benefits and/or solve one or more of the foregoing or other problems in the art with systems and methods for implementing one or more actions based on receiving customer feedback data in response to an electronic survey. In particular, systems and methods disclosed herein facilitate implementation of action items in response to receiving survey data in response to electronic survey questions. For example, systems and methods disclosed herein facilitate generating action items in response to given customer responses to one or more electronic survey questions. Additionally, systems and methods disclosed herein electronically distribute the generated action items to one or more devices to facilitate accomplishing one or more tasks associated with each respective action item. Further, systems and methods disclosed herein electronically provide one or more reminders to one or more entities to follow up and ensure performance of various tasks associated with respective action items.

To illustrate, example embodiments of the systems and methods described herein facilitate the creation of rules and/or conditions defining the generation of action items associated with given customer responses to electronic survey questions. For example, systems and methods described herein receive instructions including conditions associated with generating action items upon detecting a customer response that satisfies one or more of the conditions. For instance, in response to detecting a customer response that triggers an action item, systems and methods described herein generate action items having specified actions, tasks, and/or associated priorities for performing the actions or tasks. In this way, systems and methods described herein facilitate analyzing customer responses to identify appropriate actions in response to given customer responses.

In addition to generating action items, systems and methods described herein facilitate distributing generated action items to appropriate destinations. For example, in addition to receiving instructions identifying conditions for generating action items, the instructions can further specify destinations of users and/or devices for executing or performing actions defined by respective action items. Once generated, the systems and methods can distribute action items to the corresponding destinations for performance of tasked specified by the action items. As such, systems and methods described herein facilitate distribution of tasks to enable users, teams of users, and/or client devices to timely respond to customer responses that merit responsive action.

Further, the systems and methods described herein monitor periods of time and priorities associated with the distributed action items and provide reminders based on the associated timelines. For example, systems and methods described herein provide reminders upon determining that a period of time has passed without performance of a corresponding action. In this way, the systems and methods described herein ensure timely performance of various actions associated with respective action items.

Moreover, the systems and methods described herein enable users to view and respond to action items without interfacing with a specialized platform. For example, the systems and methods described herein facilitate distribution of action items and reminders using platforms already in use by various representatives tasked with performing one or more actions. As such, systems and methods described herein facilitate responding and following up with customer feedback without a learning curve caused as a result of implementing a specialized platform.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which:

FIG. 3 illustrates a listing of example action items in accordance with one or more embodiments;

DETAILED DESCRIPTION

Figure 1:
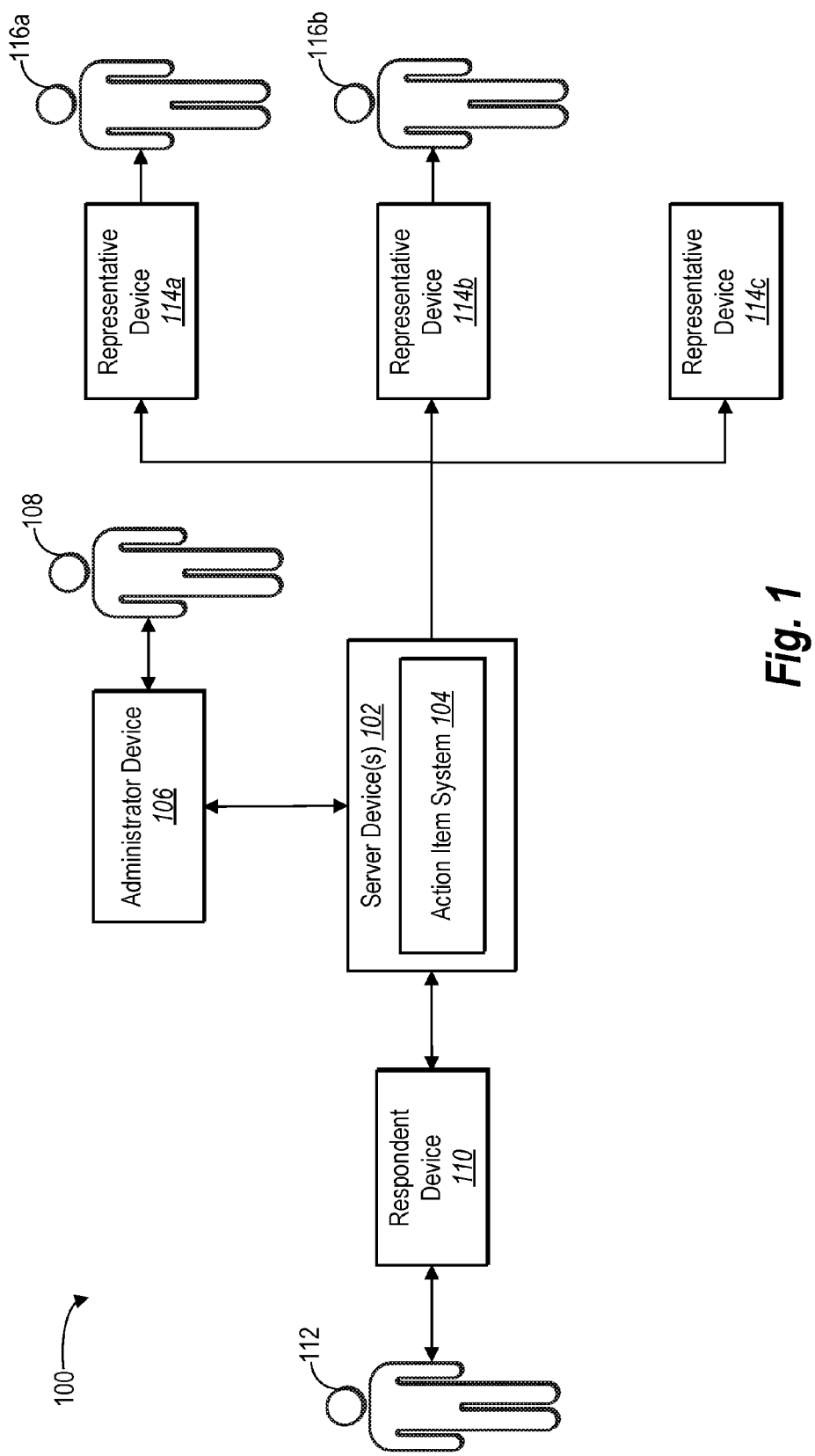
FIG. 1 illustrates a block diagram of a customer feedback system in accordance with one or more embodiments.

One or more embodiments described herein provide a customer feedback system including an action item system (or simply "system") that implements one or more action items corresponding to a customer response to an electronic survey. In particular, one or more embodiments described herein provide a system that implements an action item by generating and distributing action items to various users of the customer feedback system. Further, the system implements action items by providing follow-up reminders of the action items to the users of the customer feedback system.

For example, in one or more embodiments, the system receives instructions including conditions associated with generating and distributing action items to users of the customer feedback system. The system can further receive instructions associated with providing reminders to the users to follow up on performance of actions defined by the action items. In response to receiving or otherwise detecting a given response (e.g., electronic survey response) from a customer or respondent of a survey question, the system generates action items and distributes the action items to users tasked with performing one or more actions associated with the action items. Additionally, the system can identify action items for which a period of time has passed in which corresponding actions should have been performed, but have not been performed. In response, the system can generate one or more reminders to users of the customer feedback system.

Thus, one or more embodiments of the customer feedback system reduces or altogether eliminates user review of massive amounts of non-actionable electronic survey information by establishing conditions that define actionable customer responses and generates action items that include corresponding actions to perform in response to given customer responses. For example, upon receiving instructions from an administrative user (e.g., customer service manager) including conditions associated with generating an action item, the system can monitor or otherwise review customer responses to electronic survey questions and identify survey questions that prompt creation of a corresponding action item based on the conditions provided in the instructions. In particular, upon detecting a customer response associated with a set of conditions, the system can generate an action item including an action, a priority of the action, and other information associated with performing the action. As such, the system reviews all survey responses and generates action items containing useful information for addressing issues and/or problems identified by customer responses.

Additionally, one or more embodiments of the customer feedback system prevents random or otherwise impractical distribution of action items by distributing action items in accordance with the received instructions (e.g., from an administrative user). For example, upon generating the action item in accordance with received instructions, the system distributes the action item to a representative user, team of representative users, or a computing device in accordance with the received instructions. In particular, the system assigns a task or action to a representative user and provides access to the action item and/or associated task to the representative user including any information to assist the representative user to perform the action. For example, the system can provide a timetable, content of the customer response, an identity of the customer, and/or other information that would be useful to the representative user in performing an assigned task.

Further, one or more embodiments of the customer feedback system prevents unnecessary delay or non-performance of assigned tasks by analyzing action items and identifying conditions that merit providing a reminder about performing the action items. For example, the system can identify action items including actions that have not been performed within a period of time in which the actions should be performed. In particular, the system can compare different types of actions with one or more durations of time for particular types of actions, and accordingly, determine whether the actions have been idle or otherwise unaddressed for more than a corresponding duration of time. In response, the system can generate and provide a reminder to a representative user assigned to perform an action and/or an administrative user associated with the representative user.

In one or more embodiments, in addition or as an alternative to sending a reminder, the system re-assigns the action item to one or more different representatives upon determining that the action has not been performed, or will likely not be performed, within a determined period of time for the action item. For example, where workload for a first representative user includes multiple overdue action items, the system detects inaction on one or more action items assigned to the first representative user and assigns those action items to a second representative user with a lighter workload. In this way, the system can facilitate timely action in response to feedback received in response to an electronic survey.

Additionally, one or more embodiments of the customer feedback system reduces inefficiencies by enabling representative users to receive and respond to customer feedback using one or more platforms already available to the representatives tasked with performing various actions. For example, in distributing action items and reminders to various users of the customer feedback system, the system can provide a communication that is structured to enable a user to perform assigned actions using various Hypertext Transfer Protocol (HTTP) methods. For example, in one or more embodiments, the system generates a listing of action items assigned to a given user, compiles the action items for the given user, and generates a communication particular to the given user including a compilation of the action items and/or action item reminders for the user. As such, a user tasked with performing various actions can receive associated action items and reminders of action items including relevant information for performing the actions without learning a specialized platform or regularly logging in to a system or account unfamiliar to the user.

The customer feedback system further enables an administrator to customize triggers that prompt generation and distribution of action items in response to given customer responses. For example, as will be described in further detail below, one or more embodiments of the system provides an action item interface to an administrator that enables the administrator to select or otherwise indicate conditions that prompt the generation and distribution of action items to various users of the customer feedback system. The administrator can interact with the provided interface to identify a particular customer response or an identification of a particular customer associated with a particular action item.

Further, the administrator can interact with an action item reminder interface to generate conditions for providing reminders of action items to users of the customer feedback system. For example, the administrator can associate one or more time periods with particular action items and/or types of action items. In one or more embodiments, the administrator can interact with the reminder interface to identify respective periods of time associated with different priorities of action items. For example, the administrator can select shorter time periods (e.g., 3-5 days) associated with reminding users of high priority action items and higher periods of time (e.g., 7-15 days) associated with remaindering users of low priority action items.

When describing the one or more embodiments, the disclosure employs various terms as defined herein. For instance, as used herein, the term "electronic survey" (or simply "survey") refers to one or more electronic communications used to collect quantitative electronic information or electronic data. For example, an electronic survey may include a poll, questionnaire, census, or other type of sampling. In some example embodiments, the term electronic survey refers to a method of collecting information from respondents. As used herein, the term "respondent" refers to a person who participates in, and responds to, an electronic survey. Alternatively, a "customer" or user of a client device associated with the customer may refer to a respondent.

As used herein, the term "action item" refers to an computer-based object generated in response to receiving electronic information or electronic data (e.g., a customer response to an electronic survey question). For example, an action item may include a ticket (e.g., customer service ticket) or other object generated in response to a customer response in accordance with a set of instructions. In one or more embodiments, an action item includes an associated action (e.g., task), a time table for performing the action, a destination or address of a user assigned to perform the action, instructions associated with performing the task, content of the customer response or associated electronic survey, and other content or instructions associated with the action item. Additionally, the action item includes conditions and/or other logic associated with implementing the action item including, for example, generating the action item, distributing the action item, and providing reminders associated with performing one or more actions defined by the action item.

As used herein, a "representative" or "representative user" refers to a user of the customer feedback system that receives, or has access to, action items and performs one or more actions defined by the action items. For example, in one or more embodiments, a representative refers to a customer service representative tasked with performing actions in response to receiving given customer responses to given electronic survey questions. As used herein, a representative can refer to a single user or multiple users (e.g., a team of representative users) of the customer feedback system. Additionally, or alternatively, in one or more embodiments, a representative refers to a computing device capable of performing one or more actions in response to a received customer response.

As used herein, an "administrator" or "administrative user" refers to one or more users of the customer feedback system that provide conditions associated with implementing action items. For example, an administrator may refer to a user that interacts with an action item interface to create rules and conditions defining generating action items, distributing the action items, and providing reminders about the action items to various representatives and/or the administrator. In one or more embodiments, the administrator refers to a supervisory user (e.g., customer service supervisor) over one or more representatives tasked with distributing action items to various users and devices. For example, the administrator can refer to a supervisor of a customer service team including multiple representative users of the customer feedback system.

As used herein, "customer feedback," or "feedback" refers to data or electronic information received in response to an electronic survey. For example, customer feedback may refer to any data or electronic information included as part of a response to one or more electronic survey questions from an electronic survey. Additionally, customer feedback may refer to data or electronic information associated with a customer or respondent of the electronic survey. For example, customer feedback can include information about an identity or status of a respondent.

Furthermore, while one or more embodiments described herein are described in terms of feedback and responses from survey respondents including customers, it is appreciated that one or more embodiments described herein can similarly relate to other types of respondents and other types of electronic surveys. For instance, it is appreciated that the customer feedback system (or simply, the feedback system) can implement action items in response to any type of electronic survey in accordance to the principles described throughout the specification. In particular, any feature, process, method, function, and/or result that may be discussed below with respect to a customer feedback survey can similarly or equally apply to various other types of surveys that can be created and distributed via an electronic survey system.

As an example, a example embodiment of a feedback system can implement action items in response to feedback (e.g., a response to an electronic survey question) from an employee of a company that triggers action items including tasks to be performed by managers or various departments of the company. For instance, example action items related to an employee survey can include the action item system scheduling a follow-up meeting between the employee and the employee's manager, sending (either physically or electronically) the employee swag based on responses from his peers (e.g., other employees) on a peer review, etc. Thus, as used herein, one or more features and functionality provided by the customer feedback system can similarly apply to implementing action items, and reminders for those actions items, in response to electronic survey questions within various types of electronic surveys and from various types of respondents including, for example, customers, employees, parents, students, volunteers, or any respondent to any electronic survey question.

Additional features and characteristics of one or more embodiments of the customer feedback system are described below with respect to the Figures. For example, FIG. 1 illustrates a block diagram of an example embodiment of a customer feedback system 100. In general, and as illustrated in FIG. 1, the customer feedback system 100 includes a service device(s) 102 including an action item system 104 (or simply "system 104"). It is appreciated that the action item system 104 can be implemented within a customer feedback system 100. For example, in one or more embodiments, the action item system 104 is implemented as part of a customer feedback system implemented on one or more server devices 102. Additionally, as shown in FIG. 1, the customer feedback system 100 includes an administrator device 106, customer device 110, and any number of representative devices 114a-c. Each of the devices 106, 110, 114a-c may be associated with a respective user 108, 112, 116a-b. For example, the administrative device 106 may be associated with an administrative user 108, the customer device 110 may be associated with a respondent 112 and one or more of the representative devices 114a-c may be associated with representative users 116a-b.

As will be described in further detail below, the server device 102 can communicate with each of the administrator device 106, customer device 110, and representative devices 114a-c to facilitate administration of an electronic survey and managing action items responsive to given customer responses to electronic survey questions. In particular, the server device 102 can communicate with the administrative device 106 to receive instructions and establish conditions for managing action items. Additionally, the server device 102 can communicate with the customer device 110 to provide electronic survey questions and receive customer answers to respective survey questions. Further, the server device 102 can communicate with the representative devices 114a-c and administrator device 106 to distribute action items and reminders associated with the action items in response to the received customer answers.

As will be described in greater detail below, the server device 102 can perform or provide the various functions, features, processes, methods, and systems as described herein. Additionally, or alternatively, the administrator device 106, respondent device 110, and representative devices 114a-c can perform or provide one or more of the functions, features, processes, methods, and systems described herein. In one or more embodiments, the server device 102, administrator device 106, respondent device 110, and representative devices 114a-c coordinate together to perform or provide the various functions, features, processes, methods, and systems, as described in more detail below.

Generally, the server device 102 can include any one of various types of computing devices as further explained below with reference to FIG. 9. Additionally, one or more of the administrator device 106, respondent device 110, and representative devices 114a-c can be a mobile device (e.g., a smart phone), tablet, laptop computer, desktop computer, or any other type of client device or general computing device described in further detail below with reference to FIG. 9. The server device 102, administrator device 106, respondent device 110, and representative devices 114a-c may communicate using any communication platforms and technologies suitable for transporting data and/or communication signals, including any known communication technologies, devices, media, and protocols supportive of data communications, examples of which are described with reference to FIG. 10.

As mentioned above, the server device 102 can receive instructions associated with generating and distributing action items in response to given customer responses. For example, the server device can provide an action item interface that enables an administrator 108 to define various conditions for generating and distributing any number of action items in response to given customer feedback data representing respondent answers to electronic survey questions. In one or more embodiments, the server device 102 provides the action item interface including various options for the administrator to generate instructions, including generating or selecting conditions for generating action items and distributing the action items to various representative devices 114a-c.

Upon receiving the instructions for generating and distributing action items, the server device 102 can receive and monitor responses by respondents (e.g., customers) responding to an electronic survey. For example, as shown in FIG. 1, the server device 102 can monitor responses received from a respondent 112 who answers survey questions using a corresponding respondent device 110. In particular, the server device 102 can compare customer responses to conditions received from the administrator to determine whether a particular customer response triggers creation of an action item. As will be described in further detail below, the server device 102 can determine whether a condition is satisfied for generating an action item based on a specific customer response, various content included within a specific customer response, and/or the identity of the respondent 112 who provides the customer response.

Upon detecting that one or more conditions for generating an action item are satisfied, the server device 102 can generate an action item including one or more actions to perform in response to the customer response. For example, as will be described in further detail below, the system 104 can generate an action item including instructions and other information useful for performing the action defined by the action item. In one or more embodiments, the system 104 generates a single action item in response to a detected customer response. Alternatively, the system 104 can generate multiple action items in response to a detected customer response. For example, instructions defined by the administrator may identify multiple actions to perform in response to a given customer response.

In addition to generating action items, the server device 102 further distributes the action items to one or more representative devices 114a-c and/or associated representatives 116a-b for performance of actions defined by respective action items. For example, as shown in FIG. 1, the server device 102 can provide an action item to any one of the representatives 116a-b and/or representative devices 114a-c. In one or more embodiments, the server device 102 provides the action items to one or more of the representative devices 114a-c by transmitting the action items over a network. For example, the server device 102 can generate a report of one or more action items assigned to a given representative and provide an email or other communication to the given representative including the report of the one or more action items. Additionally, in one or more embodiments, the server device 102 provides remote access to the action items associated to one or more of the representative users 116a-b.

In one or more embodiments, the system 104 further receives instructions including conditions for providing reminders associated with performing actions associated with different action items. For example, the server device 102 can provide an action item reminder interface (or simply "reminder interface") including selectable options for the administrator 108 to identify conditions for determining whether and when to provide a reminder associated with completing or otherwise progressing a status of an action item. As an example, in one or more embodiments, the server device 102 can identify one or more periods of time associated with particular types (e.g., priorities) of action items to generate a schedule for providing reminders to various users of the customer feedback system for identified types of action items.

Further, the system 104 can analyze or monitor open or pending action items assigned to various representatives 116 to identify action items that satisfy conditions associated with providing reminders (e.g., reminder conditions) for the identified action items. In particular, the system 104 can identify those action items that satisfy reminder conditions and provide reminders to various users (e.g., representatives 116a-b, 108) of the customer feedback system 108 about the identified action items. In one or more embodiments, the server 102 provides an email reminder in accordance with the reminder instructions received from the administrator 108. Alternatively, the server device 102 can provide a text, a push notification, a web poke, or other communication to the representative user 116a-b as a reminder that the time period has passed without performing the assigned action.

In addition, the server device 102 provides the reminder to one or more additional or alternative users of the customer feedback system 100. For example, upon identifying an action item in which a specified period of time has passed without completion of the action corresponding to an action item, the server device 102 can provide a reminder to the administrator 108 of the non-performance of the action. Additionally, in one or more embodiments, the server device 102 re-assigns the action item to another user and provides the reminder to the re-assigned user tasked with performing the overdue (or nearly overdue) action.

Figure 2:
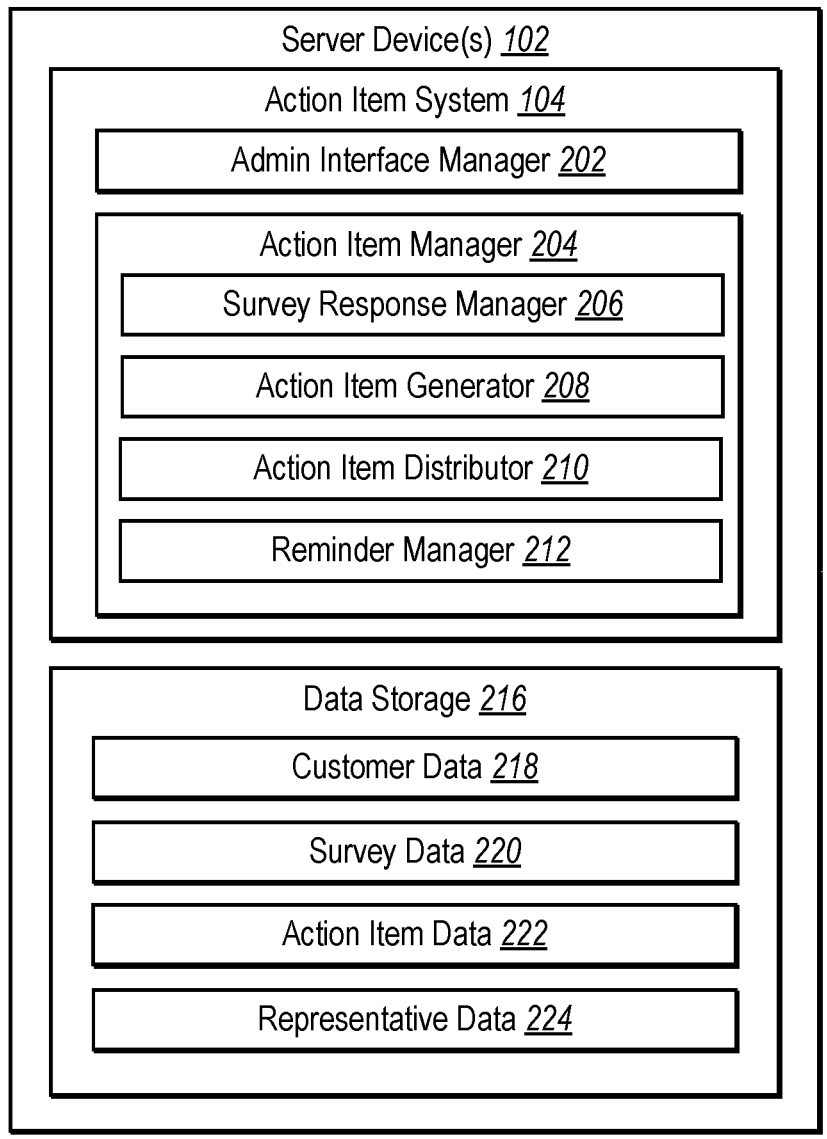
FIG. 2 illustrates a schematic diagram of a server device upon which at least a portion of the customer feedback system is implemented in accordance with one or more embodiments.

FIG. 2 illustrates an example embodiment of a server device 102 including an action item system 104 (or simply "system 104") that may operate within the customer feedback system 100 described with respect to FIG. 1. As shown, the server device 102 includes, but is not limited to, an admin interface manager 202, and an action item manager 204. As shown in FIG. 2, the action item manager 204 includes a survey response manager 206, an action item generator 208, an action item distributor 210, and a reminder manager 212. As further shown, the server device 102 includes a data storage 216 including, but not limited to, customer data 218, survey data 220, action item data 222, and representative data 224.

Each of the components 104, 202-216 of the server device 102 may be in communication with one another using any suitable communication technologies. In addition, although components 104, 202-216 are shown separately in FIG. 2, any of the components 104, 202-216 may be combined into fewer components, such as into a single component, or divided into more components as may serve a particular embodiments. Components 104, 202-216 may be located on, or implemented by, one or more computing devices, such as one or more server devices and/or client devices.

Each of components 104, 202-216 can comprise software, hardware, or both. For example, each of components 104, 202-216 can comprise one or more instructions stored on a computer-readable storage medium and one or more processors of one or more computing devices to execute instructions. When executed by the one or more processors, the computer-executable instructions cause a computing device to perform the methods described herein. Alternatively, components 104, 202-216 can comprise hardware, such as a special purpose processing device to perform a certain function or group of functions.

As mentioned above, the server device 102 includes an action item system 104 (or simply "system 104") that receives instructions and implements action items in accordance with the received instructions. In particular, as described above in connection with FIG. 1, the system 104 receives instructions from an administrator 108 and generates action items in response to received customer responses from a respondent 112. In addition, the system 104 distributes the action items to various representatives 116a-b in accordance with the instructions. Further, the system 104 generates and provides reminders to the representatives 116a-b and/or administrator 108 in accordance with the instructions received from the administrator 108.

As shown in FIG. 2, the system 104 includes an admin interface manager 202 that provides one or more action item interfaces to the administrator 108. For example, in one or more embodiments, the admin interface manager 202 provides an action item interface via a web browser interface presented on the administrator device 106. In one or more embodiments, the action item interface includes selectable options that enable the administrator 108 to identify or otherwise establish conditions for generating and distributing action items in response to survey questions that satisfy associated conditions. For example, the administrator 108 can select options presented via a graphical user interface to identify conditions or combinations of conditions associated with customer responses that trigger creation and distribution of action items.

By providing the action item interface, the admin interface manager 202 enables the administrator 108 to identify conditions of a customer response that trigger creation of an action item including an action to perform in response to the customer response. In particular, the administrator 108 can interact with the action item interface to identify conditions associated with the content of the customer response that prompts the creation of an action item including a type of action item. For example, with regard to a particular survey question, the admin interface manager 202 can enable the administrator 108 to select a particular answer or range of answers that triggers creation of an action item of a particular type and/or particular action. To illustrate, where a survey question includes possible responses ranging in value between 1-10, the administrator 108 can interact with the provided user interface to select a first action item having a first action associated with a customer response ranging from 1-3 and a second action item having a second action associated with a customer response ranging from 4-6. Further, the administrator 108 can specify that no action item is created for responses ranging from 7-10 for that particular survey question.

Additionally, and as mentioned briefly above, the admin interface manager 202 can enable an administrator 108 to associate a particular type of action item with a particular response (or range of responses) to a survey question. To illustrate, in the example above, the administrator 108 can specify that customer responses ranging from 1-3 (e.g., indicating a high level of dissatisfaction with a customer experience) triggers generation of a high priority response. Conversely, a customer response ranging from 4-6 can trigger generation of a medium or low priority response. Further, a customer response ranging from 7-10 (e.g., indicating a high level of satisfaction with a customer experience) can trigger no response (Or low priority response).

The admin interface manager 202 can further enable the administrator 108 to associate multiple action items with a particular response to a survey question. For example, the administrator 108 can specify that a customer response trigger a first action item including a communication from a representative 116 to a respondent 112. The first action item may include instructions to email the respondent 112 with an apology about a negative experience. Additionally, in one or more embodiments, the administrator 108 specifies conditions that cause the customer response to trigger a second action item including a task for the representative 116 to send a communication to a department within the same company as the representative 116. For example, where a customer response identifies an issue associated with a customer service department of a company associated with the electronic survey, the second action item may include instructions for the representative 116 (or different representative) to email the customer service department to alert the customer service department about the issue. As another example, the administrator 108 can specify that a particular customer response trigger a third action item including a communication from a representative 116 to a third party (e.g., outside a company of the administrator 108 and/or respondent 112). For example, where the respondent 112 identifies an issue that is caused by a third party (e.g., a third party vendor outside the company of the administrator 108 or respondent 112), the third action item can include instructions to notify the third party about the identified issue.

Thus, the admin interface manager 202 can enable the administrator 108 to associate an action item of a particular type and including a particular action based on content of the customer response. For example, the administrator 108 can identify that negative feedback with regard to safety can trigger a high priority action item and further indicate a first action to follow up with the customer and a second action to follow up with an internal department. As another example, the administrator 108 can identify that negative feedback with regard to food or server can trigger a medium priority action item and further indicate one or more actions to follow up with the customer and/or food department. As yet another example, the administrator 108 can identify that positive feedback can trigger a low priority (or other indicated priority) action item and further indicate an action to follow up with the customer. For example, the administrator 108 can identify an action that involves requesting the customer to refer a company or business to others.

In addition to specifying conditions and types of action items associated with content of survey responses, the admin interface manager 202 can further enable the administrator 108 to identify conditions associated with a respondent 112 that provides one or more survey responses to survey questions. For example, in one or more embodiments, the administrator 108 enables the respondent 112 to self-identify as a frequent customer when filling out the electronic survey. Alternatively, in one or more embodiments, the administrator 108 identifies specific terms or content of customer responses that identify the respondent 112 as a particular type of customer to be associated with a particular action item. In one or more embodiments, the administrator 108 may identify different action items including different associated actions based on whether a respondent 112 is a more or less frequent customer of a business.

In addition, the admin interface manager 202 can enable the administrator 108 to identify a combination of factors associated with a particular action item. For example, the administrator 108 can associate a combination of a respondent's 112 identity with the content of a survey response with a particular action item. For instance, the administrator 108 may associate a first action item with a high frequency customer that identifies a high priority issue within an electronic survey response. Further, the administrator 108 may associate a second action item with a high frequency customer that identifies a low priority issue within an electronic survey response. Additionally, the administrator 108 may associate a third action item with a low frequency customer that identifies a high priority issue within an electronic survey response and a fourth action item (or no action item) with a low frequency customer that identifies a low priority issue within an electronic survey response.

For example, where a respondent 112 is a frequent customer of a business and familiar with standard business practices, the administrator 108 may wish to identify an associated action item as a high priority action item based on the loyalty or importance of the customer. Alternatively, where a respondent 112 is a one-time customer of a business, the administrator 108 may wish to identify the associated action item as a low priority action item with a corresponding action.

As such, the admin interface manager 202 can provide options that enable the administrator 108 to specify one or more conditions associated with the identity of a respondent 112 and further identify corresponding types of action items and/or actions to be performed in response to feedback from the respondent 112 and associated customer response that satisfies the conditions. For example, the administrator 108 can identify that a given response to a survey question from a respondent 112 that is a frequent customer triggers a high priority action item having a particular action where the same response to the survey question from a respondent 112 that is a one-time customer triggers a low priority action item including a different action (or does not trigger an action item).

In addition to enabling an administrator 108 to identify conditions and generate instructions for generating and distributing action items, the admin interface manager 202 can further enable the administrator 108 to identify additional conditions (e.g., reminder conditions) associated with generating and providing reminders associated with particular types of action items. For example, in one or more embodiments, the admin interface manager 202 provides a reminder interface including selectable options that enable the administrator 108 to identify reminder conditions associated with providing reminders for action items. In particular, the admin interface manager 202 can identify reminder conditions for generating reminders for action items that satisfy one or more of the reminder conditions.

For example, in one or more embodiments, the admin interface manager 202 can enable the administrator 108 to associate certain types of action items (e.g., high priority, medium priority, low priority) with certain time periods for performing the action items. To illustrate, in one or more embodiments, the admin interface manager 202 enables the administrator 108 to associate high priority action items with a first time period (e.g., 3-5 days), medium priority action items with a second time period (e.g., 7-10 days), and low priority action items with a third time period (e.g., 15-30 days). Thus, the admin interface manager 202 enables the administrator 108 to identify reminder conditions associated with a timeline for providing reminders for different types of action items.

In addition to enabling the administrator 108 to identify a reminder schedule, the admin interface manager 202 further provide a reminder interface that includes options for the administrator 108 to identify distribution instructions associated with providing reminders for different action items (e.g., different types of action items). In particular, for each type of action item (e.g., high priority, medium priority, low priority), the admin interface manager 202 can enable the administrator 108 to select a destination or recipient for providing the reminder. As an example, for high priority action items, the administrator 108 can select "administrator" and "owner" (e.g., representative assigned to the action item) as destinations to send a reminder for an overdue high priority action item. As another example, for low priority action items, the administrator 108 can only select "owner" as a destination to send the reminder.

As another example, the admin interface manager 202 can provide a reminder interface that enables the administrator 108 to identify a communication protocol or communication type for transmitting the reminder. For example, in one or more embodiments, the administrator 108 select an "email" option for sending the reminder to the selected destination via an email. Alternatively, in one or more embodiments, the administrator 108 selects one or multiple other options including, for example, text, push notification, ping notification, and other options for communicating a reminder to the selected recipient. In one or more embodiments, the admin interface manager 202 enables the administrator 108 to specify different type of communication method for providing the reminder than for providing the action item. For example, where the action item is provided via a dashboard or via posting to a database of action items, the administrator 108 can identify a different communication method or communication platform (e.g., email, text) for communicating the action item reminder.

As another example, the admin interface manager 202 can provide a reminder interface that enables the administrator 108 to identify a format and content to include within the reminder. For instance, the administrator 108 can identify options to include the content of the customer response, the content of the survey question, instructions for performing the action, a history of communications with the respondent 112, and other information associated with the action item. In one or more embodiments, the administrator 108 can select an option to include a link or uniform resource locator (URL) to other information that may be useful in performing the action of the action item.

As mentioned above, the admin interface manager 202 provides selectable options for modifying the format and/or content included within a reminder for an action item. In particular, in one or more embodiments, the admin interface manager 202 enables the administrator 108 to modify the content or format by inserting a line of code having a particular format that references information from different sources and displays that information within the reminder communication. For example, in one or more embodiments, the administrator 108 can utilize Piped Text to reference additional content to include within the reminder communication to a selected recipient. In one or more embodiments, the admin interface manager 202 provides the Piped Text to indicate options that the administrator 108 has selected. Alternatively, in one or more embodiments, the administrator 108 can enter Piped Text to reference additional content to include within the reminder.

Moreover, the admin interface manager 202 enables the administrator 108 to further customize and generate instructions for providing reminders associated with performance or non-performance of action items to various recipients. For example, in addition or as an alternative to providing a reminder, the administrator 108 can further select an option to re-assign the action item where a duration of time has passed without performance of an action. In one or more embodiments, the administrator 108 can select an option to re-assign or otherwise change ownership (e.g., change an owner ID) from a first representative 116a to a second representative 116b. Alternatively, in one or more embodiments, the administrator 108 can select an option to reassign ownership of the action item to the administrator 108 himself.

In one or more embodiments, the admin interface manager 202 enables the administrator 108 to select options to escalate a reminder schedule of a particular type of action item. For example, in one or more embodiments, the administrator 108 can identify an option that changes the priority of the action item in response to detecting that a duration of time specified for the priority of action item has passed without performance of the action item. For example, where a duration of time for low priority action items has passed without performance of a low priority action item, the administrator 108 can identify an option to escalate the priority of the action item to a middle or high priority type. Thus, the action item may be associated with a new period of time, and reminders may be scheduled more frequently (e.g., weekly, daily, or multiple times a day) until the action item has been completed.

As shown in FIG. 2, the system 104 further includes an action item manager 204 that receives the various instructions from the administrator 108 and facilitates implementation of action items corresponding to customer responses received in response to an electronic survey. In particular, as shown in FIG. 2, the action item manager 204 includes a survey response manager 206 that collects, receives, or otherwise obtains customer responses to electronic survey questions. For example, the action item manager 204 can receive or collect customer responses from a respondent device 110 associated with a respondent 112.

The survey response manager 206 can further detect whether customer responses received from a respondent 112 satisfies one or more of the administrator-specified conditions for generating and distributing action items in response to particular customer responses. In particular, the survey response manager 206 can analyze received or incoming customer responses and tag or otherwise identify customer responses that trigger one or more conditions associated with implementing action items. For example, in response to receiving a customer response, the survey response manager 206 can determine that content of the customer response and/or an identity of the respondent 112 associated with the customer response satisfies one or a combination of multiple conditions that prompts creation of an action item associated with one or a combination of the identified conditions.

As shown in FIG. 2, the action item manager 204 further includes an action item generator 208. Upon detecting that a survey question satisfies one or more of the conditions for generating a corresponding action item, the action item generator 208 generates one or more action items in accordance with the instructions received by the administrator 108. For example, in one or more embodiments, upon detecting that a received customer response satisfies a condition, the action item generator 208 creates an action item including an action, an owner ID (e.g., an ID associated with representative 116), and addition information (e.g., instructions for performing the action) specified by the administrator 108 via the action item interface. Additionally, based on the content of the survey response and/or identity of the respondent 112, the action item generator 208 can assign a priority to the generated action item.

As described above, the admin interface manager 202 enables the administrator 108 to identify customer responses (e.g., content of customer responses) that trigger associated action items. Additionally, as mentioned above, the action item generator 208 can detect that a particular answer (e.g., a selected binary answer) or range of answers satisfies a condition and generate the associated action item. Further, in one or more embodiments, the action item generator 208 analyzes the text to determine whether the content of a customer response satisfies a condition specified by the administrator 208 and generate an associated action item corresponding to the analyzed content of the survey response. For example, the action item generator 208 can analyze text of a customer response and identify a safety issue, a service issue, or other content that triggers generation of an action item.

As described above, the conditions identified by the administrator 108 can dictate the type of action item, the action of the action item, and other content of the action item. For example, where the respondent 112 is a frequent customer and where the survey response refers to a customer service issue, the combination of conditions may indicate a high priority action item that includes a phone call to the respondent 112. Thus, the action item generator 208 may generate a high priority action item including instructions to call the respondent 112 with a recommended response over the phone. Alternatively, where the respondent 112 is a one-time customer and where the survey response refers to the same or different customer service issue, the combination of conditions may indicate a low priority action item that includes an email communication to the respondent 112. Thus, the action item generator 208 may generate a low priority action item including instructions to email the respondent 112 with a coupon for a future transaction and a recommended or automated response via email.

Additionally, in one or more embodiments, a customer response may correspond to one or more conditions associated with multiple action items. For example, where a respondent 112 provides a customer response that includes a complaint about food that they were served, the combination of conditions that trigger a first action item having a low priority that includes an email to the respondent 112. Additionally, the customer response may satisfy one or more conditions that trigger a second action item having a high priority that includes an email to the food staff to notify them of the complaint. Thus, the action item generator 208 may generate a first action item having a low priority including an action to email the respondent 110 and a second action item having a high priority including an action to email or otherwise notify the food staff of the complaint.

Moreover, while several examples described herein relate specifically to addressing customer complaints, in one or more embodiments, the conditions can further specify corresponding action items for responding to positive customer feedback. For example, where a respondent 110 has provided a positive customer response, the received conditions can correspond to an action item including an action to request the respondent 110 to recommend or refer the product or service to others. For example, the action can include an email requesting the respondent 110 to refer a friend, post a positive review on social media, or join a customer reference program. Additionally, where the system 104 determines or otherwise identifies that the respondent 110 has more than a threshold number of social media followers (or associated users, e.g., friends) or has a history of recommending products and services to followers, the conditions may correspond to a high priority action item including the recommended action.

As shown in FIG. 2, the action item manager 204 further includes an action item distributor 210. The action item distributor 210 can transmit, post, share, or otherwise distribute one or more action items to various representatives 116a-b and/or representative devices 114a-c in accordance with default settings and/or conditions specified by the administrator 208. For example, in one or more embodiments, the action item distributor 210 posts action items to a queue of action items accessible to one or more representatives 116*a-b*. In this way, the action item distributor 210 provides access to the generated action items to representatives 116*a-b* logged into a system for retrieving or otherwise accessing the action items.

Alternatively, in one or more embodiments, the action item distributor 210 distributes the action items by generating a report of action items particular to one or more users of the customer feedback system 100. For example, in one or more embodiments, the action item distributor 210 compiles all action items assigned to a first representative 116*a* over a period of time and periodically generates an email including a report of the action items to send to the first representative 116*a*.

In addition to generating action item reports and distributing reports to respective representatives 116*a-b*, the action item distributor 210 can further generate action item reports for an administrator 108 tasked with supervising or otherwise overseeing performance of actions by the representatives 116*a-b*. Where the action item distributor 210 generates action item reports for a first representative 116*a* or second representative including only actions assigned to respective representatives 116*a-b*, the action item distributor 210 can additionally generate an action item report for the administrator 108 including action items assigned to multiple representatives 116*a-b*.

In addition to distributing action items to representative users 116*a-b*, one or more embodiments of the action item distributor 210 distributes certain action items to representative devices 114*a-c* without consideration of representatives 116*a-b*. For example, as shown in FIG. 1, a third representative device 114*c* may perform one or more automated actions associated with action items that do not necessarily require action by a representative user 116. For example, where an action item is generated that is designated as low priority and includes an action that can be automated, the action item distributor 210 can distribute the low priority action item to the third representative device 114*c* to be performed without involvement by one or more of the representative users 116*a-b*.

As shown in FIG. 2, the action item manager 204 further includes a reminder manager 212. In one or more embodiments, the reminder manager 212 executes instructions including reminder conditions received via the reminder interface provided by the admin interface manager 202. In particular, the reminder manager 212 identifies reminder conditions associated with providing reminders and performs various reminder actions in accordance with the instructions received from the administrator 108.

For example, in one or more embodiments, the reminder manager 212 receives reminder instructions indicated via the reminder interface including associated conditions for performing various reminder actions. Upon receiving the reminder instructions, the reminder manager 212 can generate reminder logic for monitoring and identifying generated action items that satisfy one or more conditions that trigger corresponding reminders. For example, the reminder manager 212 can generate or leverage various tools for analyzing the generated action items and identifying specific action items that trigger the corresponding reminder actions. In particular, in one or more embodiments, the reminder manager 212 converts or otherwise configures the received reminder instructions including identified reminder conditions to trigger generation of reminder actions associated with identified action items.

For example, in one or more embodiments, the reminder manager 212 utilizes the received reminder instructions and generates a configuration object to be utilized as a tool for querying pending action items to detect or otherwise identify one or more of the action items that satisfy one or more of the reminder conditions. For example, in one or more embodiments, the reminder manager 212 generates a JavaScript Object Notation (JSON) object including a structure that specifies reminder conditions for generating reminders for action items that satisfy one or more of the reminder conditions. In particular, the reminder manager 212 can utilize the JSON object to identify any pending action items within a database of action items (e.g., ticket database) that satisfy one or more of the reminder conditions specified by the administrator 108 (e.g., via the reminder interface).

As mentioned above, in one or more embodiments, the reminder manager 212 generates the configuration object using the reminder conditions corresponding to certain action items. For example, in one or more embodiments, the reminder manager 212 generates a standard query language (SQL) query for each identified reminder condition. Additionally, the reminder manager 212 can utilize a union operator using, for example, a disjunctive normal form (DNF) to combine any number of the identified reminder conditions associated with performing reminder actions based on one or a combination of reminder conditions identified for action items.

In one or more embodiments, the reminder manager 212 queries, scans, or otherwise analyzes generated action items to identify which of the action items satisfies one or more of the conditions associated with generating reminders for corresponding action items. In particular, the reminder manager 212 can utilize the configuration object to query each of multiple action items and identify each action item that triggers generation of a reminder action. For example, the reminder manager 212 can filter a collection of action items by analyzing each action item to determine whether any action item satisfies the reminder conditions.

As an example, the reminder manager 212 can determine whether to generate a reminder for a high priority action item including an action assigned to a representative 116 that was assigned four days previously. Where the reminder conditions specify that high priority action items have a time duration of three days to perform the associated action, the reminder manager 212 may determine that the time period for performing the action for the high priority action item is overdue and that a reminder should be generated. In response, the reminder manager 212 can generate a reminder in accordance with instructions associated with the identified set of conditions that the high priority action item satisfies.

As another example, the reminder manager 212 can determine whether to generate a reminder for a low priority action item including an action assigned to a representative 116 that was assigned four days previously. Where the reminder conditions specify that low priority action items have a time duration of fourteen days to perform the associated action, the reminder manager 212 may determine that the time period for performing the action for the low priority action item has not passed and that a reminder need not be generated. In response, the reminder manager 212 can discard the low priority action item and analyze further action items to determine whether to generate a reminder.

In addition to generating the reminder for the action item, the reminder manager 212 can identify reminder instructions associated with distributing the reminder to one or more users of the customer feedback system 100. For example, in one or more embodiments, the reminder instructions indicate that a first reminder should be generated for the administrator 108 and a second reminder should be generated for an associated owner ID (e.g., an owner ID associated with a representative 116 to be assigned to the action item) for any overdue action items having a high priority. As an alternative example, the reminder instructions can indicate that a single reminder should be generated for the assigned representative for any overdue action items having a low priority.

Further, the reminder manager 212 may generate an action item reminder including specific content or a specific format based on one or more of the conditions that the action item satisfies. For example, upon triggering creation of an action item, the reminder manager 212 may generate a reminder including text of the customer response, additional content of the electronic survey, or further instructions depending on one or more of the satisfied reminder conditions. As an example, for high priority action items, the reminder manager 212 can generate a reminder including more content associated with the respondent 112 than a reminder for a low priority action item. Additionally, in one or more embodiments, the reminder distributed to the administrator 108 may be formatted differently and/or include more content than the reminder distributed to the representative 116.

Additionally, in one or more embodiments, the reminder manager 212 distributes the action item to a designated recipient via a particular type of communication in accordance with the reminder instructions. For example, in one or more embodiments, the reminder manager 212 can generate an email or other form of communication for the intended recipient. The communication can include any type of communication designated by the reminder conditions and associated reminder instructions for generating and distributing the reminder for the action item. For example, in one or more embodiments, the reminder manager 212 generates a reminder email for the representative 116 including information therein that the representative can utilize for performing the action designated by the action item. In one or more embodiments, the reminder email includes a link, tool, or any information needed for performing the action of the action item. As such, the recipient of the reminder email can perform the action of the action item without logging into an account or specialized platform for executing action items.

Additionally, in one or more embodiments, the reminder manager 212 groups the reminders for particular recipients. For example, in one or more embodiments, the reminder manger 212 generates an HTML report including an indication of any reminders for action items assigned to a particular representative 116. The reminder manager 212 generates an email including the report and sends the email to the representative 116. In one or more embodiments, the reminder manager 212 further sends the email including report for a particular representative 116 (or multiple representatives 116a-b) to the administrator 108.

As mentioned above, and as shown in FIG. 2, the server device 102 further includes a data storage 216 that includes customer data 218. In particular, the customer data 218 includes information associated with a respondent 112 providing a customer answer to an electronic survey question. For example, the customer data 218 can include an identification of the respondent 112, a type or category of the respondent 112 with regard to a business (e.g., frequent customer, one time customer), and other information associated with the respondent 112. In one or more embodiments, the customer data 218 includes a history of customer responses and/or communications with the respondent 112 from various representatives 116a-b and/or the administrator 108.

As further shown in FIG. 2, the data storage 216 includes survey data 220. In particular, the survey data 220 includes information associated with an electronic survey and customer responses to particular questions of the electronic survey. For example, the survey data 220 can include one or more customer responses to electronic survey questions. In one or more embodiments, the survey data 220 includes content of a customer response including, for example, a selection of a particular answer and/or text entered by a respondent 112 in response to a survey question.

As further shown in FIG. 2, the data storage 216 includes action item data 222. In particular, the action item data 222 includes information associated implementing an action item. The action item data 222 includes content of an action item including, for example, an action (e.g., task) to be performed, a time period for performing different actions (or types of action), a destination or address of a representative 116 assigned to perform the action, and other information associated with the action item. In one or more embodiments, the action item data 222 includes conditions and other information associated with various stages of implementing action items. For example, action item data 222 can include conditions and other information for generating and distributing an action item. Additionally, action item data 222 can include reminder conditions and other information for generating and providing a reminder for an action item.

As further shown in FIG. 2, the data storage 216 includes representative data 224. In particular, the representative data 224 includes information associated with one or more representatives 116a-b tasked with performing actions defined by various action items. For example, the representative data 224 can include identifiers of representatives 116a-b, representative devices 114a-c, or other information associated with respective representatives 116a-b and/or representative devices 114a-c. In one or more embodiments, the representative data 224 includes an identification of one or more communication types for communicating with one or more representatives 116a-b. For example, where reminders are communicated via text or email, the representative data 224 can include a phone number or email address for communicating a reminder to respective representatives 116a-b.

As mentioned above, action items can include one or more actions, assigned priorities, and other information. Additionally, as mentioned above, the action item system 104 (or simply "system 104") can generate a report of action items including any number of elements. For example, FIG. 3 illustrates an example action item report 302 including a listing of action items. As shown in FIG. 3, each listing includes an identifier (ID), a representative ID, a priority, an action, a timetable, a status, and a link. It is appreciated that the action item report 302 can include any number of action item listings.

As shown in FIG. 3, each action item can be assigned to a representative 116 associated with a representative ID. For example, the action item report 302 includes names of representatives (e.g., Jake, Ashley, John) that have been assigned to perform actions for respective action items. Additionally, as shown in FIG. 3, the action item report 302 shows a priority associated with each of the action items. For example, an action item can have a low, medium, or high priority associated with content of a customer response and/or an identity of a respondent 112 providing the customer response. To illustrate, the system 104 can assign a high priority to action items generated in response to a customer response from a frequent customer, a medium priority to action items generated in response to repeat customers, and a low priority to action items generated in response to first-time customers. As described above, the priority associated with each action item may be assigned by the system 104 based on one or a combination of multiple conditions associated with generating the action items.

As further shown in FIG. 3, the action item report 302 includes an action associated with each action item. For example, actions can include sending an email response to a respondent 112, making a phone call to the respondent 112, emailing a coupon to the respondent 112, or other action as identified by the administrator 108. Additionally, the action item report 302 can include periods of time for performing actions. Further, the action item report 302 can include a present status of an action item.

Additionally, as shown in FIG. 3, the action item report 302 can include a link for each of the action items. In particular, upon accessing the action item report 302, a representative 116 can select a link that links to a web page including additional information about the action item. For example, a representative 116 can access portions of an electronic survey, text of the respondent's 112 customer response, or other information that can be used to respond to a particular customer response. In one or more embodiments, the link includes a Uniform Resource Locator (URL) to a user interface that enables the representative 116 to perform the action and/or otherwise response to the customer response. For example, in response to selecting a link, the representative 116 can be routed to a response interface (e.g., email interface) including instructions for performing the action or otherwise completing a task associated with the respective action item.

Figure 4:
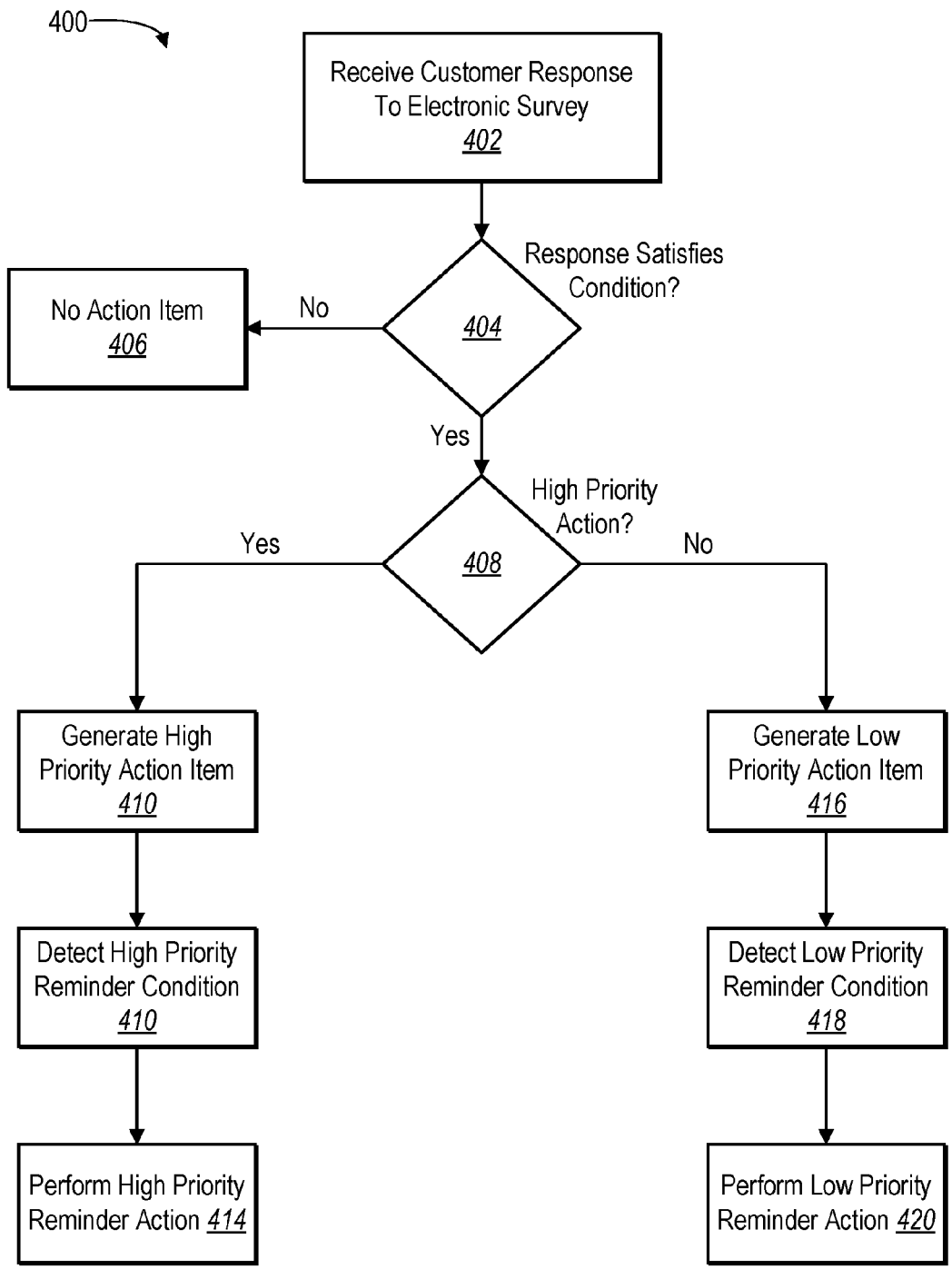
FIG. 4 illustrates a flow diagram of implementing an action item in accordance with one or more embodiments.

FIG. 4 illustrates an example method 400 for implementing an action item in response to a customer response. In particular, the method 400 shown in FIG. 4 illustrates an example implementation that includes generating and distributing action items in accordance with received conditions and further generating and distributing one or more reminders in accordance with reminder conditions received from an administrator 108. For example, the method 400 can be performed after an administrator 108 identifies conditions dictating implementation of action items performed in response to a customer response that satisfies one or more of the identified conditions. Further, while FIG. 4 illustrates example steps according to one embodiment, other embodiments may omit, add to, reorder, and/or modify any of the steps shown in FIG. 4. One or more steps shown in FIG. 4 may be performed by any of the components illustrated in the system 100 illustrated in FIG. 1. Further, one or more steps of the method 400 may be performed by a server device 102, administrator device 106, respondent device 110, representative device 114, or a combination of multiple devices.

For example, as shown in FIG. 4, the method 400 includes receiving 402 a customer response to an electronic survey. Upon receiving the customer response, the system 104 can determine 404 whether the response satisfies one or more conditions for generating an action item. If the customer response does not satisfy any conditions, the system 104 can disregard 406 the customer response without generating any action item(s).

Alternatively, if the system 104 determines that the response satisfies one or more conditions, the system 104 can proceed by determining 408 whether the satisfied condition(s) correspond to a high priority response. For example, the system 104 can determine if the content of the customer response corresponds to a condition that triggers creation of a high priority action item. For instance, if the customer response relates to safety of future customers, then the system 104 can identify the customer response as high priority. On the other hand, if the customer response relates to the taste of food, the system 104 can identify the response as low priority. As another example, the system 104 can determine if an identity of the respondent 112 has been identified as a condition that triggers creation of a high priority action. For instance, if the respondent 112 is a frequent customer, the system 104 can identify the customer response as high priority. Alternatively, if the respondent 112 is a first-time customer, the system 104 can identify the customer response as low priority.

As shown in FIG. 4, if the system identifies a customer response as high priority, the system 104 proceeds to generate 410 a high priority action item. As mentioned above, generating the high priority action item can include generating an action item including a particular action to perform by a particular representative as specified by an administrator 108. For example, the administrator 108 can identify that high priority action items include a particular action (e.g., phone call, email) to be performed by a first representative 114a.

As shown in FIG. 4, the system 104 can detect 412 a high priority reminder condition associated with the high priority action item. For example, based on reminder conditions previously received from the administrator 108, the system 104 can determine that a period of time associated with high priority action items has passed without a change of status of the action item and/or non-performance of the action specified by the action item. For instance, where a reminder condition indicates that high priority action items are to be completed within three days of generating the action item, the system 104 can detect a high priority reminder condition if the high priority action item was created more than three days ago and has yet to be completed.

As shown in FIG. 4, in response to detecting the high priority reminder condition, the system 104 can perform 414 a high priority reminder action. In particular, the system 104 can generate and provide a reminder to one or more representatives 116a-b and/or the administrator 108 as specified by the reminder conditions and associated reminder instructions corresponding to high priority action items. For example, for high priority action items, the system 104 can generate and provide an email reminder to the administrator 108 and the assigned representative 114 that the defined period of time for the action item has passed and provide a report or link within the email reminder that enables the administrator 108 or representative 114 to perform the delayed action. Additionally, as described above, the system 104 can generate the action item reminder including content as specified by the reminder conditions and associated reminder instructions.

If, on the other hand, the system 104 identifies that the customer response is not a high priority response (e.g., that the conditions for generating the action item indicate the customer response as low priority), the system 104 can create 416 a low priority action item including a particular action to be performed by a particular representative 114. For example, where the high priority response triggers creation of an action item including a first action assigned to a first representative 116a, the low priority response can trigger creation of an action item including a second action assigned to a second representative 116b.

It is appreciated that the low priority status of the customer response can trigger creation of an action item including a different action or different representative 114 assigned to perform an action of the low priority action item than the high priority action item. For example, a low priority action may correspond to an email message with an attached coupon where a high priority action may correspond to a phone call followed up with an email message with the same or different attached coupon. As a further example, the low priority action item may be distributed to a particular representative 114 (e.g., first representative 116a) trained to address low priority action items where a high priority action item is distributed to a different representative 114 (e.g., second representative 116b) trained to address high priority action items.

Additionally, as shown in FIG. 4, the system 104 can detect 418 a low priority reminder condition. For example, based on the low priority type of action item, the system 104 can identify that more than fourteen days (or other specified time period for performing low priority action items) have passed without a change in status or performance of the action item. In response, the system 104 can perform 420 a low priority reminder action. For example, the system 104 can email a reminder to the representative 114 tasked with executing the low priority action item.

In one or more embodiments, performing the low priority reminder action includes escalating the priority for the action item. For example, in one or more embodiments, in response to the period of time passing without performance of the action of the low priority action item, the system 104 generates a new action item including a medium or high priority action item for the customer response that includes an action and assigned representative 116 to perform the higher priority action item. As a result, the escalated priority action item can satisfy a different set of reminder conditions associated with providing more frequent reminders for performing an action of the action item.

Figure 5:
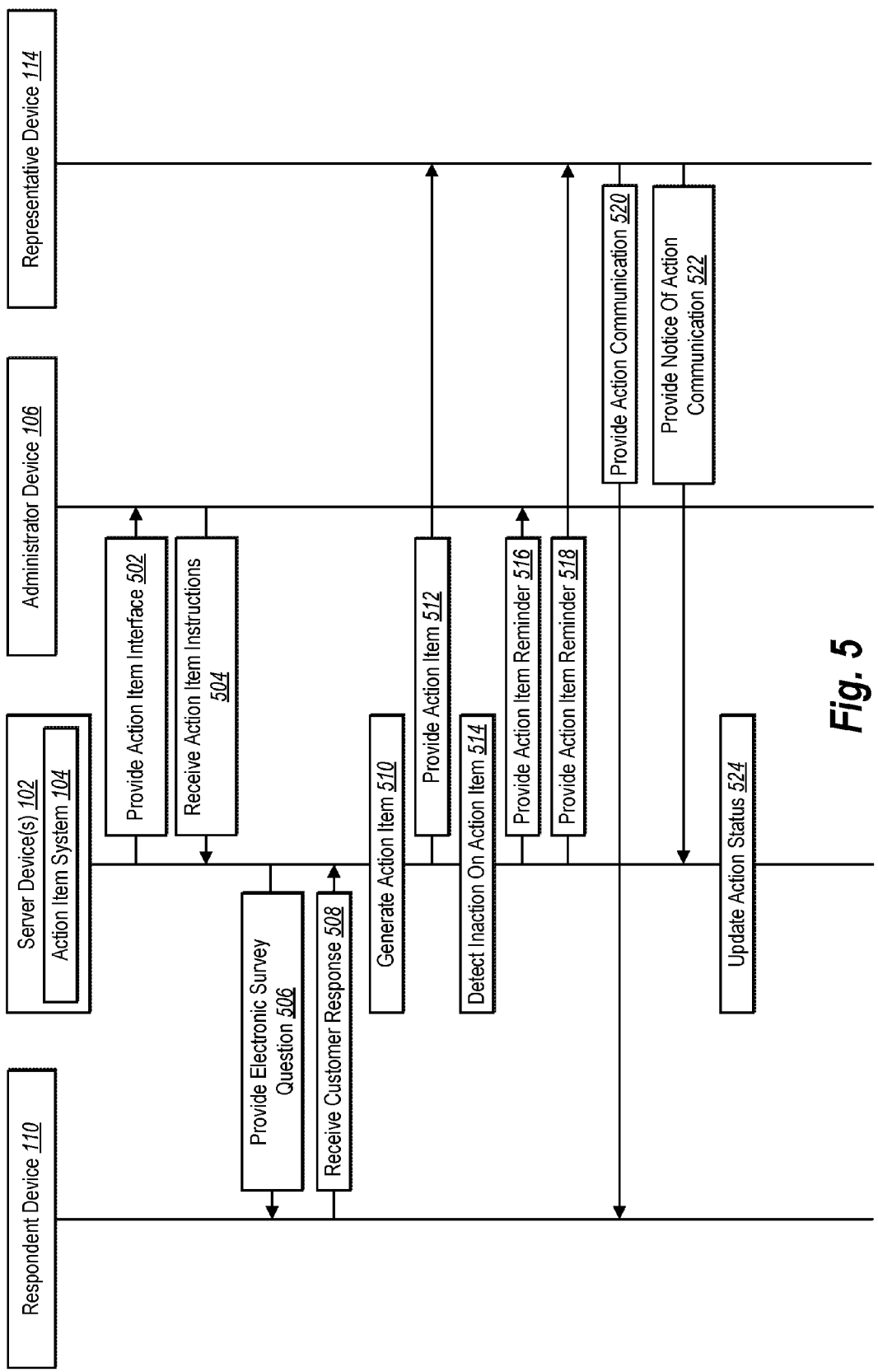
FIG. 5 illustrates a flow diagram of interactions between devices of a customer feedback system to implement an action item in response to a customer response in accordance with one or more embodiments.

FIG. 5 illustrates a flow diagram representing a process of implementing an action item in accordance with one or more embodiments described herein. As shown in FIG. 5, the flow diagram includes a respondent device 110, a server device 102 including an action item system 104, an administrator device 106, and a representative device 114. In particular, FIG. 5 illustrates an example embodiment in which the action item system 104 facilitates creation of an action item, distribution of the action item, and providing a reminder to a representative device in response to a customer response and in accordance with conditions associated with implementing the action item.

For example, as illustrated in FIG. 5, the server device 102 provides 502 an action item interface to the administrator device 106. In particular, the server device 102 provides a graphical user interface to the administrator device 106 to enable an administrator 108 to select options associated with implementation of an action item in response to a customer response. For example, the action item interface can include selectable options to identify conditions of customer responses that trigger creation of action items, distribution of action items, and/or generating reminders for action items. Additionally, the action item interface can include options associated with content to include within an action item or reminder of an action item. The action item interface can further include options for an administrator 108 to indicate priority and/or time periods for performing an action based on features of the customer response.

In one or more embodiments, the server device 102 provides multiple action item interfaces to the administrator device 106. For example, the server device 102 can provide different graphical user interfaces associated with different stages of implementing an action item. For instance, in one or more embodiments, the server device 102 provides a first action item interface for an administrator 108 to select options associated with creating and distributing an action item. Additionally, the server device 102 can provide a second action item interface (e.g., reminder interface) for an administrator 108 to select options associated with providing a reminder for an action item.

As further shown in FIG. 5, the server device receives 504 instructions for implementing action items. In particular, the server device receives instructions associated with implementing action items based on selections of an administrator 108 interacting with the action item interface and selecting various options. For example, the instructions can include conditions of customer responses that trigger creation and distribution of action items. In addition, the instructions can include details of the action items including, for example, actions, a priority of the action item, and other information associated with the action item. Additionally, the instructions can include reminder conditions and further instructions associated with generating and providing reminders about the action items. For example, the instructions can include reminder conditions indicating periods of time for responding to different types of action items, and other information for generating reminders as well as instructions for providing the reminders to one or more representatives 116a-b and/or administrator 108.

As further shown in FIG. 5, the server device 102 provides 506 an electronic survey question to a respondent device 110. For example, the server device 102 can provide an electronic survey to a respondent 112 on the respondent device 110. The electronic survey can include any number of survey questions relating to a respondent's 110 experience with a company or product. For example, where the administrator 108 and representatives 116a-b make up a customer service team associated with a particular business, the electronic survey questions can relate to an experience of the respondent 112 with the business.

As further shown in FIG. 5, the server device 102 can receive 508 a customer response. In particular, the server device 102 can receive a customer response to the electronic survey question provided to the respondent device 110. In one or more embodiments, the server device 102 receives multiple customer responses from a respondent device 110 and determines whether one or more of the received customer responses satisfy one or more of the received conditions associated with implementing action items in response to given customer responses.

Upon detecting that the received customer response satisfies one or more conditions associated with generating action items, the server device 102 generates 510 an action item. In particular, in one or more embodiments, the server device 102 generates the action item in response to content of the customer response. Additionally or alternatively, the server device 510 can generate the action item based on the identity of the respondent 112 that provides the customer response. Moreover, in accordance with the received instructions for generating action items, the customer response can correspond to content of the generated action item including, for example, the action, a priority, and other features or characteristics of the action item. Additionally, generating the action item can include generating distribution instructions and reminder instructions associated with distributing the action item and generating reminders for the action item.

As shown in FIG. 5, the server device 102 further provides 512 the action item to a representative device 114. In one or more embodiments, the server device 102 provides the action item to the representative device 114 by providing access to the action item. For example, the server device 102 can provide access to a collection or database of action items assigned to a representative 116 associated with the representative device 114. In one or more embodiments, the server device 102 provides the action item to the representative device 114 by communicating (e.g., emailing) the action item directly to the representative device 114.

In one or more embodiments, the server device 102 provides the action item to the representative device 114 together with one or more additional action items generated for a representative 116. For example, as described above, the system 104 can generate an action item report that includes multiple action items and provide the generated action item together with the other action items of the action item report. In one or more embodiments, the server device 102 periodically (e.g., once/day) sends any action items generated for a representative 116 to the representative device 114 together with all action items generated for the representative 116. For example, the server device 102 can send multiple action items to the representative device 114 via an email or other communication.

As shown in FIG. 5, the server device 102 can detect 514 inaction on the action item corresponding to one or more reminder conditions associated with the generated action item. For example, the system 104 can analyze the action item and determine that no action has been taken with respect to the action item for a specified period of time for the generated action item. In one or more embodiments, detecting inaction includes determining that a status of the action item has not changed for the period of time indicated by the reminder conditions for the particular type of action item. As another example, the system 104 can determine inaction based on failure to complete the action and/or failure to change a status of the action item to "closed," "completed," or other status that indicates the action item is complete.

As shown in FIG. 5, upon detecting inaction on the action item, the server device 102 provides 516 a first action item reminder to the representative device 114 in accordance with the instructions for generating and providing the reminder. Additionally, as shown in FIG. 5, the server device 102 can provide 518 a second action item reminder to the administrator device 106. For example, where the action item satisfies reminder conditions for both a first reminder action and a second reminder action, the system 104 can perform both reminder actions in response to identifying the action item that satisfies each of the different combinations of reminder conditions. As an example, where a high priority action item is more than one day late, the server device 102 can provide a reminder to the representative device 114. However, where the high priority action item is more than three days late, the system may identify multiple sets of identical or a different combination of reminder conditions that trigger sending a first reminder to the representative device 114 and a second reminder to the administrator device 106.

While FIG. 5 illustrates one example in which reminders are generated and provided to each of the administrator device 106 and the representative device 114, in one or more embodiments, reminders can be generated and provided to either the administrator device 106 or the representative device 114. Additionally, in one or more embodiments, the destination of one or more reminders can depend on a priority of the action item or other identified reminder conditions associated with the action item (e.g., generated in accordance with conditions associated with the customer response). For example, the server device 102 can generate reminders for both the administrator device 106 and the representative device 114 for high priority action items or a single reminder for the representative device 106 for low priority action items without providing a reminder to the administrator device 106.

In one or more embodiments, the server device 102 provides the reminders to the administrator device 106 and the representative devices 114 via an email. In one or more embodiments, the server device 102 provides reminders via a text message or other communication method as defined by the instructions for implementing the action item. As an alternative to providing a direct communication including the reminder for the action item, in one or more embodiments, the server device 102 provides the reminder together with an action item report including one or more additional reminders and/or action items. For example, in one or more embodiments, the server device 102 provides one or more reminders together with new action items assigned to a particular representative 116.

As shown in FIG. 5, upon receiving the reminder, the representative device 114 can perform an action of the action item. For example, as shown in FIG. 5, the representative device 114 can provide 520 an action communication to the respondent device 110. In one or more embodiments, the representative device 114 sends an email including a message in response to the customer response to the electronic survey question. As another example, the representative device 114 can send an email including a coupon or other response to the customer response to the electronic survey question. Alternatively, depending on the customer response and/or action item, the representative device 114 can provide an automated response to the customer response received at the server device 102.

As shown in FIG. 5, upon providing the action communication (or performing the action of the action item), the representative device 114 can provide 522 a notice of the action communication to the server device 102. For example, upon completing an action, the representative 116 can provide a notification that the action of the action item has been completed. In response, the server device 102 can update 524 the status of the action item. For example, in one or more embodiments, the server device 102 can update a status of the action item to "closed," "completed," or other equivalent status. In one or more embodiments, the server device 102 updates the status in response to detecting delivery of a communication from the representative device 114 to the respondent device 110. Alternatively, in one or more embodiments, the server device 102 updates the action status based on a received indication that the action of the action item has been completed from the representative device 114. For example, in one or more embodiments, the server device updates the action status based on a manual update of the action item status from a representative 116.

Figure 6:
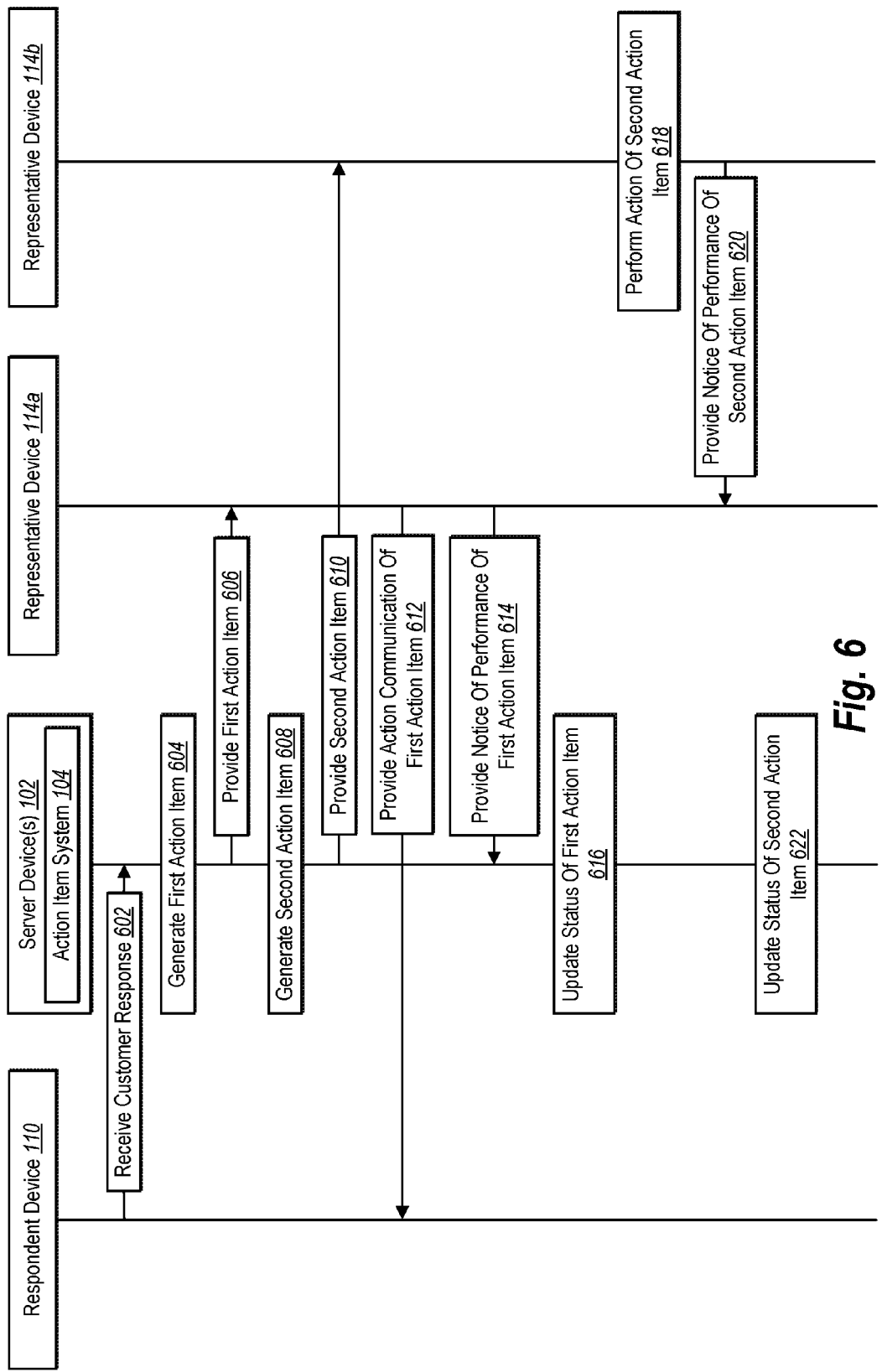
FIG. 6 illustrates a flow of interactions between devices of a customer feedback system to implement multiple action items in response to a customer response in accordance with one or more embodiments.

FIG. 6 illustrates a flow diagram representing a process of implementing an action item in accordance with one or more embodiments described herein. As shown in FIG. 6, the flow diagram includes a respondent device 110, a server device 102 including an action item system 104, and representative devices 114a-b. In particular, FIG. 6 illustrates an example embodiment in which the action item system 104 facilitates creation of multiple action items and distributing the action items to different representative devices 114*a-b*. It is appreciated that one or more steps of the process illustrated in FIG. 6 can be performed in combination with other methods described herein.

Additionally, it is appreciated that the steps illustrated in FIG. 6 can be preceded by one or more steps described above in connection with FIG. 5. For example, similar to the process shown in FIG. 5, the server device 102 can provide an action item interface and/or reminder interface, receive instructions for generating the action item and associated reminders, and provide an electronic survey question to the respondent device 110. Additionally, as shown in FIG. 6, and as similarly described in connection with FIG. 5, the server device 102 can receive 602 a customer response to an electronic survey question.

As shown in FIG. 6, the server device 102 can generate 604 a first action item based on the customer response. For example, the server device 102 can generate the first action item in accordance with instructions received from an administrator 108 via an action item interface. As further illustrated by FIG. 6, the server device 102 provides 606 the first action item to a first representative device 114*a*. It is appreciated that in one or more embodiments, the first representative device 114*a* corresponds to a first representative 116*a* tasked with performing actions of action items that involve communicating with a respondent 110. As such, the server device 102 can provide the first action item to the first representative device 114*a* based on an action that involves communicating with the respondent 112.

As further shown in FIG. 6, the server device 102 can generate 608 a second action in response to the received customer response. In one or more embodiments, the second action includes a second action and a respective time period for performing the second action. As further shown in FIG. 6, the server device 102 provides 610 the second action item to the second representative device 114*b*. It is appreciated that in one or more embodiments, the second representative device 114*b* corresponds to a second representative 116*b* tasked with performing actions that involve communicating with individuals other than the respondent 112. As such, the server device 102 can provide the second action item to the second representative device 114*b* based on an action that involves communicating with an employee or department associated with a company administering the electronic survey.

As shown in FIG. 6, the first representative device 114*a* can perform a first action of the first action item. For example, the first representative device 114*a* can provide 612 a communication to the respondent device 110. Additionally, as shown in FIG. 6, the representative device 114*a* can provide 614 a notice of performance of the first action item. In response to receiving the notice of performance of the first action item, the server device 102 can update 616 the status of the first action item.

As shown in FIG. 6, the first representative device 114*b* can perform 618 a second action of the second action item. For example, the second representative device 114*b* can provide a communication about the customer response to a relevant employee or department of a company that is associated with the customer response. To illustrate, where the customer response includes a complaint about a meal provided by a business, the second action item can include a task for a second representative 116*b* associated with the second representative device 114*b* to provide feedback to a food department of the business. As further shown in FIG. 6, the second representative device 114*b* can provide 620 a notice of performance of the second action item. In response to receiving the notice, the server device 102 can update 622 the status of the second action item.

Figure 7:
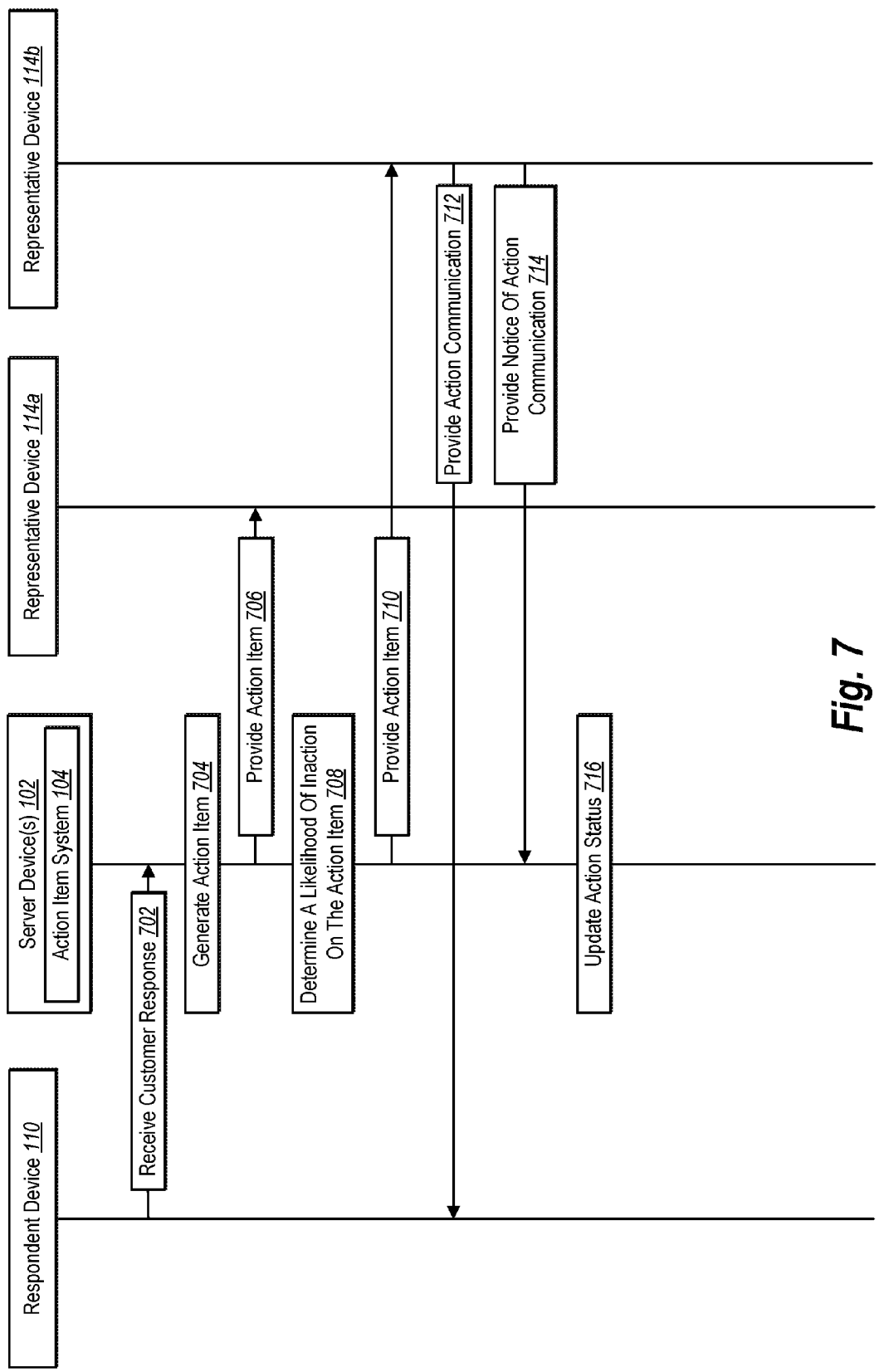
FIG. 7 illustrates a flow diagram of interactions between devices of a customer feedback system to implement an action item in response to a customer response accordance with one or more embodiments.

FIG. 7 illustrates a flow diagram representing a process of implementing an action item in accordance with one or more embodiments described herein. As shown in FIG. 7, the flow diagram includes a respondent device 110, a server device 102 including an action item system 104, and representative devices 114*a-b*. In particular, FIG. 7 illustrates an example embodiment in which the action item system 104 facilitates creation of multiple action items and distributing the action items to different representative devices 114*a-b*. It is appreciated that one or more steps of the process illustrated in FIG. 7 can be performed in combination with other methods described herein.

Additionally, it is appreciated that the steps illustrated in FIG. 7 can be preceded by one or more steps described above in connection with FIG. 5. For example, similar to the process shown in FIG. 5, the server device 102 can provide an action item interface, receive instructions for implementing the action item, and provide an electronic survey question to the respondent device 110. Additionally, as shown in FIG. 7, and as similarly described in connection with FIG. 5, the server device 102 can receive 702 a customer response to an electronic survey question.

As shown in FIG. 7, the server device 102 can generate 704 an action item based on the customer response. For example, the server device 102 can generate the action item in accordance with instructions received from an administrator 108 via an actin item interface. As further illustrated by FIG. 7, the server device 102 provides 706 the action item to a first representative device 114*a*. For example, the server device 102 can email the action item or otherwise provide access to the action item to the first representative device 114*a*.

As described above, the server device 102 can analyze one or more action items and determine whether the action item satisfies one or more of the reminder conditions. For example, where the action item is a high priority action item and reminder conditions indicate that high priority action items should be performed within three days, the system 104 can identify whether the unperformed action item is over three days old. As an alternatively, in one or more embodiments, the server device 102 determines 708 a likelihood of inaction on the action item by a representative 116*a* associated with the first representative device 114*a*. For example, when analyzing the action item, the server device 102 may further detect that a certain period of time has passed in which the representative device 114*a* has not accessed a database of action items assigned to the representative 116*a*. As another example, the server device 102 can detect that a current workload of the representative 116*a* is higher than a threshold number of action items and determine that the representative 116*a* is unlikely to complete an action of the action item within the associated period of time for the action item.

In response to determining that the action of the action item will likely not be performed within the defined period of time, the server device 102 can perform a reminder action in accordance with reminder instructions and associated reminder conditions for the generated action item. As shown in FIG. 7, the server device can provide 710 or otherwise re-distribute the action item to a second representative device 116*b*. For example, the system 102 can identify that a second representative 114*b* has recently logged into a system for accessing action items and determine that the second representative 114b is more likely to perform the action of the action item within the defined period of time. Alternatively, the system 102 can identify that a workload of the second representative 114b is lighter than the first representative 114a.

As shown in FIG. 7, the second representative device 114b can perform an action of the action item. For example, the second representative device 114b can provide 712 a communication to the customer device 110 in response to the customer response. Additionally, once the second representative device 114b has performed the action, the second representative device 114b can provide 714 a notification of the communication or other performance of the action to the server device 102. In response, the server device 102 can update 716 a status of the action item.

Figure 8:
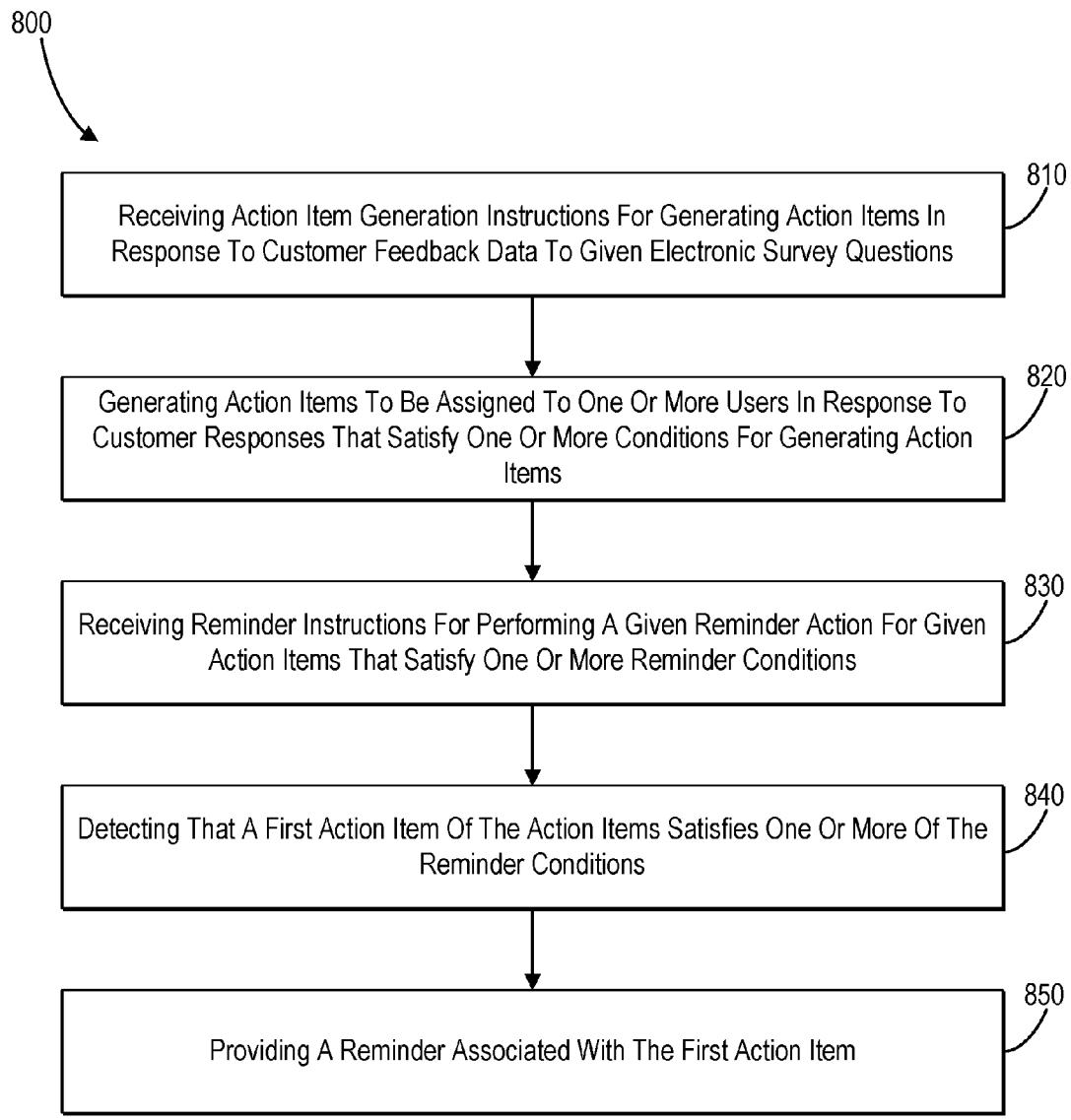
FIG. 8 illustrates a flowchart of a series of acts in a method for implementing an action items in accordance with one or more embodiments.

FIGS. 1-7, the corresponding text, and the examples, provide a number of different systems, devices, and processes for implementing action items in response to received customer feedback. In addition to the foregoing, embodiments disclosed herein also can be described in terms of flowcharts comprising acts and steps in a method for accomplishing a particular result. For example, FIGS. 8-9 illustrate flowcharts of exemplary methods in accordance with one or more embodiments disclosed herein. The methods described in relation to FIGS. 8-9 can be performed with less or more steps/acts or the steps/acts can be performed in differing orders. Additionally, the steps/acts described herein can be repeated or performed in parallel with one another or in parallel with different instances of the same or similar steps/acts.

FIG. 8 illustrates a flowchart of an example method 800 for generating action items and providing reminders associated one or more of the action items. While FIG. 8 illustrates example steps according to one embodiment, other embodiments may omit, add to, reorder, and/or modify any of the steps shown in FIG. 8. One or more steps shown in FIG. 8 may be performed by any of the components illustrated in the system 100 illustrated in FIG. 1. Further, one or more steps of the method 800 may be performed by server device 102, administrator device 106, respondent device 110, and representative devices 114a-c.

As illustrated in FIG. 8, the method 800 includes an act 810 of receiving action item generation instructions for generating action items in response to feedback data to given electronic survey questions. For example, the act 810 can involve receiving, via a communication network, action item generation instructions including a first plurality of conditions associated with generating action items in response to feedback data within given responses to given electronic survey questions. In one or more embodiments, receiving action item generation instructions includes receiving an indication of one or more user selections of an action item interface. For example, the method 800 can include providing an action item interface including a plurality of selectable options to an administrator 108. In one or more embodiments, receiving the action item generation instructions involves receiving the identified selections of the selectable options selected by the administrator 108.

Additionally, as shown in FIG. 8, the method 800 includes an act 820 of generating action items to be assigned to one or more users in response to responses that satisfy one or more conditions for generating action items. For example, the act 820 can include generating, by at least one processor, a plurality of action items to be assigned to one or more users in response to a plurality of responses that satisfy one or more of the first plurality of conditions. In one or more embodiments, generating the plurality of action items involves generating action items including an assigned priority, specific content, and distribution instructions in accordance with the first plurality of conditions associated with generating the action items.

In one or more embodiments, the method 800 includes distributing the generated action items to one or more users. For example, the method 800 can include distributing the generated action items to one or more users assigned to perform one or more respective actions of the action items in response to responses to an electronic survey question. In one or more embodiments, distributing the action items involves distributing the plurality of action items to one or more users via user accounts associated with the one or more users. For example, the action items can be posted to a dashboard or collection of action items accessible via user accounts (e.g., employee accounts) that the assigned users (e.g., representatives 116) are registered to use.

As further shown in FIG. 8, the method 800 includes an act 830 of receiving reminder instructions for performing a given reminder action for given action items that satisfy one or more reminder conditions. For example, the act 830 can include receiving, via a communication network, reminder instructions including a second plurality of conditions associated with performing a given reminder action associated with a given action item. In one or more embodiments, the act 830 includes receiving, from an administrator 108, reminder instructions comprising a second plurality of conditions associated with performing reminder actions for given action items from the plurality of action items.

In one or more embodiments, the second plurality of conditions (e.g., reminder conditions) includes a plurality of designated time periods for performing actions associated with respective types of action items. For example, the second plurality of conditions can include a plurality of designated time periods corresponding to assigned priorities of action items. In one or more embodiments, the plurality of designated time periods includes a first time period for high priority action items and a second time period for low priority action items. For example, the first time period can be a shorter time period than the second time period. As such, the second plurality of conditions can prompt generation of a reminder more frequently (or sooner after creation) for higher priority action items than for lower priority action items.

In response to receiving the reminder instructions including the reminder conditions, the method 800 can further generate a configuration object. For example, the method 800 can include generating a JSON object. In one or more embodiments, the configuration object includes one or more SQL queries including one or more combinations of SQL queries corresponding to individual reminder conditions or combinations of reminder conditions of associated with performing a given reminder action associated with a given action item (or type of action item). As mentioned above, the configuration object can be utilized to iteratively analyze a collection of action items to identify action items that satisfy the second plurality of conditions.

As shown in FIG. 8, the method 800 further include an act 840 of detecting that a first action item of the action items satisfies one or more of the reminder conditions. For example, act 840 can involve detecting, by at least one processor, that a first action item of the plurality of action items satisfies one or more of the second plurality of conditions. As an additional example, act 840 can involve detecting, by at least one processor, that one or more of the plurality of action items satisfy one or more of the second plurality of conditions.

In one or more embodiments, detecting that the first action item of the plurality of action items satisfies one or more of the second plurality of conditions includes querying the plurality of action items using the configuration object generated using the second plurality of conditions. For example, detecting that the first action item satisfies one or more of the reminder conditions comprises querying a collection of action items using a JSON object including a structure that specifies one or more recipients for a reminder, content of a reminder, when a reminder should be sent, and other information associated with providing a reminder to an intended recipient.

Further, as mentioned above, the reminder conditions can include a plurality of designated time periods for performing actions associated with respective types (e.g., priorities) of action items. Additionally, in one or more embodiments, detecting that the first action item satisfies one or more of the reminder conditions involves determining that a designated time period of the plurality of time periods corresponding to the first action item has passed without performance of an action of the first action item.

As shown in FIG. 8, the method 800 further includes an act 850 of providing a reminder associated with the first action item. For example, the act 850 can involve in response to detecting that the first action item satisfies one or more of the second plurality of conditions, providing a reminder associated with the first action item to an assigned user of the one or more users. As another example, the act 850 can involve in response to detecting that one or more action items of the plurality of action items satisfy one or more of the second plurality of conditions, providing a reminder associated with the one or more of the plurality of action items to the administrator 108. For example, in one or more embodiments, providing the reminder can involve providing the reminder to an assigned representative 116 for performing an action of the action item. Additionally or alternatively, providing the reminder can involve providing the reminder to a supervisory user (e.g., administrator 108) associated with the assigned user (e.g., representative 116).

In one or more embodiments, providing the reminder to an assigned user involves sending an email including content defined by the reminder instructions associated with the one or more of the second plurality of conditions satisfied by the first action item. In one or more embodiments, the email includes a link that provides access to the first action item without logging into a user account associated with the assigned user that grants access to each of multiple action items of the plurality of action items assigned to the assigned user.

In one or more embodiments, the method 800 can include performing various reminder actions in accordance with the reminder instructions. For example, in one or more embodiments, the method 800 includes, in response to detecting that the first action item satisfies one or more of the second plurality of conditions, escalating a priority of the first action item to a higher priority than a priority initially assigned to the first action item. As another example, in one or more embodiments, the method 800 includes, in response to detecting that the first action item satisfies one or more of the second plurality of conditions, re-assigning the action item to another user of the one or more users. The method 800 can further involve providing the reminder associated with the first action item to the another user of the one or more users.

In one or more embodiments, the method 800 includes providing the action item and reminder of the action item using different communication methods. For example, in one or more embodiments, the method 800 includes, in response to generating the first action item, distributing the first action item to the assigned user via a first communication method. In addition, providing the reminder associated with the first action item to the assigned user includes providing the reminder via a second communication method. In one or more embodiments, the second communication method includes a different communication platform than the first communication method.

Additionally, in one or more embodiments, distributing the action items and/or reminders can include grouping the action items and reminders by assigned user. For example, in one or more embodiments, the method 800 involves generating a subgroup of the one or more action items for an assigned user. Additionally, in one or more embodiments, the method 800 involves providing a reminder associated with the subgroup of the one or more action items to the assigned user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
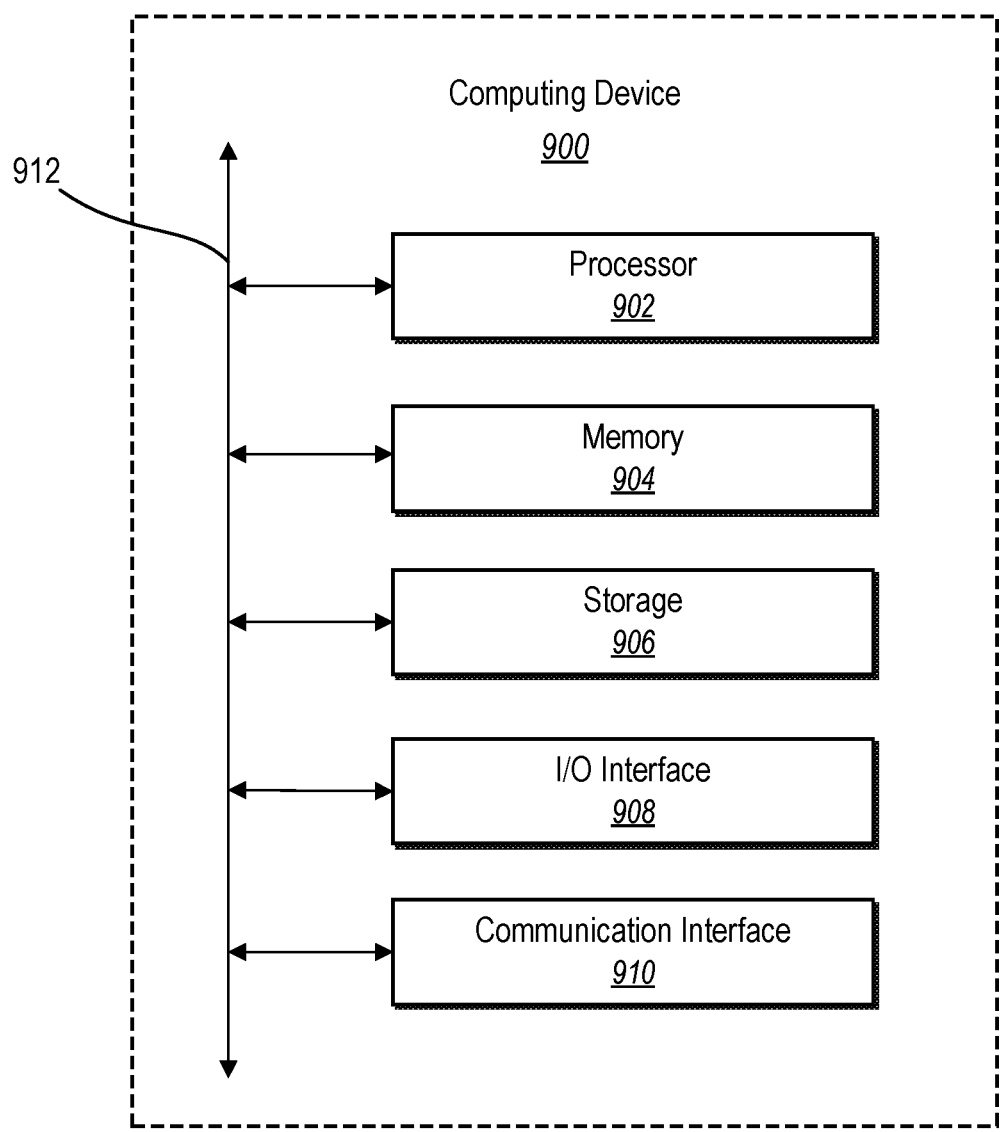
FIG. 9 illustrates a block diagram of a computing device in accordance with one or more embodiments.

FIG. 9 illustrates a block diagram of exemplary computing device 900 that may be configured to perform one or more of the processes described above. One will appreciate that one or more computing devices such as the computing device 900 may implement the server device 102 and/or other devices described above in connection with FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
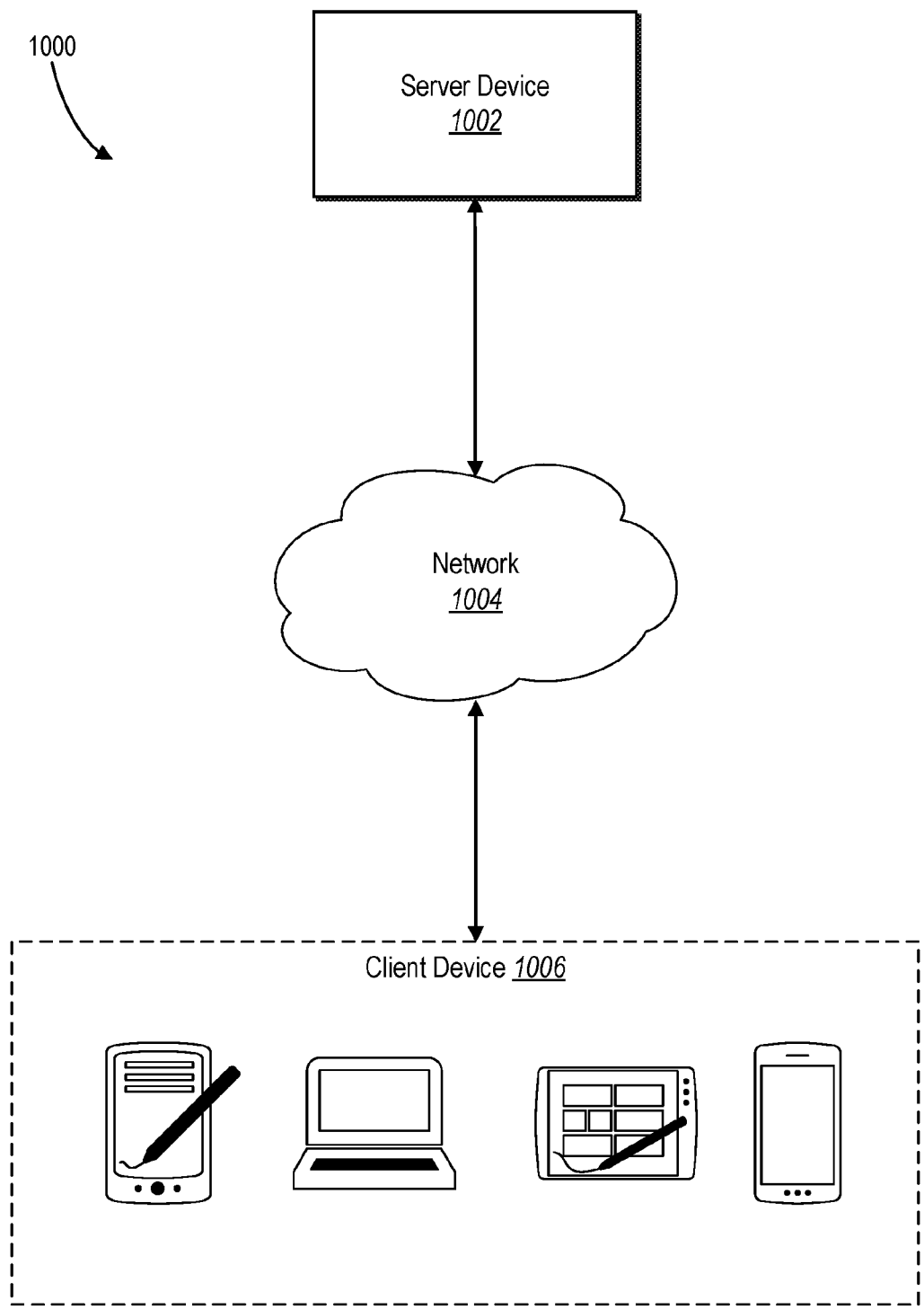
FIG. 10 illustrates a networking environment of a customer feedback system in accordance with one or more embodiments.

FIG. 10 illustrates an example network environment 1000 of a customer feedback system 100. Network environment 1000 includes a client device 1006, and a server device 1002 connected to each other by a network 1004. Although FIG. 10 illustrates a particular arrangement of client system 1006, server device 1002, and network 1004, this disclosure contemplates any suitable arrangement of client device 1006, server device 1002, and network 1004. As an example and not by way of limitation, two or more of client device 1006, and server device 1002 may be connected to each other directly, bypassing network 1004. As another example, two or more of client device 1006 and server device 1002 may be physically or logically co-located with each other in whole, or in part. Moreover, although FIG. 10 illustrates a particular number of client devices 1006, survey devices 1002, and networks 1004, this disclosure contemplates any suitable number of client devices 1006, survey devices 1002, and networks 1004. As an example and not by way of limitation, network environment 1000 may include multiple client devices 1006, survey devices 1002, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client device 1006, and server device 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example and not by way of limitation, a client device 1006 may include any of the computing devices discussed above in relation to FIG. 8. A client device 1006 may enable a network user at client device 1006 to access network 1004. A client device 1006 may enable its user to communicate with other users at other client systems 906.

In particular embodiments, client device 1006 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1006 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. Client device 1006 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1002 may include a variety of servers, sub-systems, programs, modules, logs, and data stores. In particular embodiments, server device 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 may also include suitable components such as network interfaces, security mechanisms, load balancers, failover servers, management-and-network-operations consoles, other suitable components, or any suitable combination thereof.

In particular embodiments, server device 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
receiving, via a communication network, action item generation instructions comprising a first plurality of conditions associated with generating action items in response to feedback data within given responses to given electronic survey questions;
generating, by at least one processor, a plurality of action items to be assigned to one or more users in response to a plurality of responses that include feedback data satisfying one or more of the first plurality of conditions;
receiving, via the communication network, reminder instructions comprising a second plurality of conditions associated with performing a given reminder action associated with a given action item;
generating, by the at least one processor, a configuration object comprising a Javascript notation (JSON) object;
detecting, by the at least one processor, that a first action item of the plurality of action items satisfies one or more of the second plurality of conditions by querying the plurality of action items using the JSON object; and
in response to detecting that the first action item satisfies one or more of the second plurality of conditions, providing a reminder associated with the first action item to an assigned user of the one or more users.

2. The method as recited in claim 1, wherein the second plurality of conditions comprises a plurality of designated time periods for performing actions associated with respective types of action items.

3. The method as recited in claim 2, wherein detecting that the first action item of the plurality of action items satisfies one or more of the second plurality of conditions comprises determining that a designated time period of the plurality of designated time periods corresponding to the first action item has passed without performance of an action of the first action item.

4. The method as recited in claim 2, wherein the plurality of designated time periods correspond to assigned priorities of action items.

5. The method as recited in claim 4, wherein the plurality of designated time periods comprises a first time period for high priority action items and a second time period for low priority action items.

6. The method as recited in claim 5, wherein the first time period is shorter than the second time period.

7. The method as recited in claim 1, further comprising providing the reminder to a supervisory user associated with the assigned user.

8. The method as recited in claim 1, wherein providing the reminder to the assigned user comprises sending an email including content defined by the reminder instructions associated with the one or more of the second plurality of conditions satisfied by the first action item.

9. The method as recited in claim 8, wherein the email comprises a link that provides access to the first action item without logging into a user account associated with the assigned user that grants access to each of multiple action item of the plurality of action items assigned to the assigned user.

10. The method as recited in claim 1, further comprising, in response to detecting that the first action item satisfies one or more of the second plurality of conditions, escalating a priority of the first action item to a higher priority than a priority initially assigned to the first action item.

11. The method as recited in claim 1, further comprising, in response to detecting that the first action item satisfies one or more of the second plurality of conditions:
re-assigning the first action item to another user of the one or more users; and
providing the reminder associated with the first action item to the another user of the one or more users.

12. The method as recited in claim 1, further comprising distributing the plurality of action items to the one or more users, wherein distributing the plurality of action items comprises providing access to the plurality of action items to the one or more users via user accounts associated with the one or more users.

13. The method as recited in claim 1, further comprising:
in response to generating the first action item, distributing the first action item to the assigned user via a first communication method; and
wherein providing the reminder associated with the first action item to the assigned user comprises providing the reminder via second communication method, the second communication method comprising a different communication platform than the first communication method.

14. A method comprising:
receiving, via a communication network, action item generation instructions comprising a first plurality of conditions associated with generating action items in response to feedback data within given responses to given electronic survey questions;
generating, by at least one processor, a plurality of action items to be assigned to one or more users in response to a plurality of responses that satisfy one or more of the first plurality of conditions;
receiving, from an administrator via the communication network, reminder instructions comprising a second plurality of conditions associated with performing reminder actions for given action items from the plurality of action items;
generating, by the at least one processor, a configuration object comprising a Javascript notation (JSON) object;
detecting, by the at least one processor, that one or more of the plurality of action items satisfy one or more of the second plurality of conditions by querying the plurality of action items using the JSON object; and
in response to detecting that one or more action items of the plurality of action items satisfy one or more of the second plurality of conditions, providing a reminder associated with the one or more of the plurality of action items to the administrator.

15. The method of claim 14, further comprising providing an action item interface comprising a plurality of selectable options to the administrator, wherein receiving the reminder instructions comprises receiving, from the administrator, an indication of one or more of the plurality of selectable options provided via the action item interface.

16. The method of claim 14, further comprising:
generating a subgroup of the one or more action items for an assigned user; and
providing a reminder associated with the subgroup of the one or more action items to the assigned user.

17. A system comprising:
at least one processor; and
a non-transitory computer readable storage medium storing instructions thereon that, when executed by the at least one processor, cause the system to:
receive, via a communication network, action item generation instructions comprising a first plurality of conditions associated with generating action items in response to feedback data within given responses to given electronic survey questions;
generate a plurality of action items to be assigned to one or more users in response to a plurality of responses that satisfy one or more of the first plurality of conditions;
receive, via the communication network, reminder instructions comprising a second plurality of conditions associated with performing a given reminder action associated with a given action item;
generate, by the at least one processor, a configuration object comprising a Javascript notation (JSON) object;
detect that a first action item of the plurality of action items satisfies one or more of the second plurality of conditions by querying the plurality of action items using the JSON object; and
in response to detecting that the first action item satisfies one or more of the second plurality of conditions, provide a reminder associated with the first action item to an assigned user of the one or more users.

18. The system as recited in claim 17, wherein the second plurality of conditions comprises a plurality of designated time periods for performing actions associated with respective types of action items.

19. The system as recited in claim 18, wherein detecting that the first action item of the plurality of action items satisfies one or more of the second plurality of conditions comprises determining that a designated time period of the plurality of designated time periods corresponding to the first action item has passed without performance of an action of the first action item.

20. The system as recited in claim 18, wherein the plurality of designated time periods correspond to assigned priorities of action items.

* * * * *